United States Patent
Kozu et al.

(10) Patent No.: US 9,753,307 B2
(45) Date of Patent: Sep. 5, 2017

(54) SPECTACLE LENS, MANUFACTURING METHOD THEREOF AND LENS SUPPLY SYSTEM

(71) Applicant: HOYA CORPORATION, Tokyo (JP)

(72) Inventors: Kazuma Kozu, Tokyo (JP); Takashi Hatanaka, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/777,136

(22) PCT Filed: Mar. 6, 2014

(86) PCT No.: PCT/JP2014/055726
§ 371 (c)(1),
(2) Date: Sep. 15, 2015

(87) PCT Pub. No.: WO2014/141985
PCT Pub. Date: Sep. 18, 2014

(65) Prior Publication Data
US 2016/0033791 A1    Feb. 4, 2016

(30) Foreign Application Priority Data

Mar. 15, 2013 (JP) .................................. 2013-053101

(51) Int. Cl.
G02C 7/02 (2006.01)
G05B 19/4097 (2006.01)

(52) U.S. Cl.
CPC ............... *G02C 7/024* (2013.01); *G02C 7/02* (2013.01); *G02C 7/022* (2013.01); *G02C 7/027* (2013.01);
(Continued)

(58) Field of Classification Search
CPC .......... G02C 7/027; G02C 7/02; G02C 7/022; G02C 7/028; G02C 7/024; G02C 7/06;
(Continued)

(56) References Cited

U.S. PATENT DOCUMENTS 6,009,564 A    1/2000    Tackles et al.
6,129,435 A    10/2000    Reichow et al.
(Continued)

FOREIGN PATENT DOCUMENTS

CN    101135781 A    3/2008
CN    102227674 A    10/2011
(Continued)

OTHER PUBLICATIONS

May 15, 2015 International Preliminary Report on Patentability issued in International Patent Application No. PCT/JP2014/055726.
(Continued)

*Primary Examiner* — Darryl J Collins
(74) *Attorney, Agent, or Firm* — Oliff PLC

(57) ABSTRACT

A lens supply system has: an initial shape data obtaining unit that obtains initial shape data of a spectacle lens; a shape data correcting unit that corrects the initial shape data such that, when a base curve of an initial lens manufactured based on the initial shape data is defined as a first base curve, a predetermined lens having a second base curve lower than the first base curve is defined as a target spectacle lens, prismatic effects which light rays in respective visual line directions passing through a center of an eye assumed in optical design receive from the initial lens coincide with or approach prismatic effects which the light rays receive from the target spectacle lens; and a spectacle lens manufacturing unit that manufactures a spectacle lens based on the corrected initial shape data.

10 Claims, 14 Drawing Sheets

(52) U.S. Cl.
CPC ............... *G05B 19/4097* (2013.01); *G05B 2219/45157* (2013.01)

(58) Field of Classification Search
CPC ............... G02C 7/14; G05B 19/4097; G05B 2219/45157
USPC ..... 359/159.75; 351/159.58, 159.59, 159.01, 351/159.17, 159.73–159.76
See application file for complete search history.

(56) References Cited

U.S. PATENT DOCUMENTS

| | | | |
|---|---|---|---|
| 7,762,663 | B2 | 7/2010 | Kaga |
| 8,547,635 | B2 | 10/2013 | Saylor et al. |
| 8,814,353 | B2 | 8/2014 | Kozu et al. |
| 9,104,041 | B2 | 8/2015 | De Rossi et al. |
| 2002/0149739 | A1 | 10/2002 | Perrott et al. |
| 2003/0169397 | A1 | 9/2003 | Reichow et al. |
| 2008/0284978 | A1 | 11/2008 | Kaga |
| 2010/0296052 | A1 | 11/2010 | Esser et al. |
| 2011/0202286 | A1 | 8/2011 | De Rossi et al. |
| 2011/0205626 | A1 | 8/2011 | Saylor et al. |
| 2012/0008089 | A1 | 1/2012 | Kozu et al. |
| 2014/0313476 | A1 | 10/2014 | Kozu et al. |

FOREIGN PATENT DOCUMENTS

| | | | | |
|---|---|---|---|---|
| CN | 102422201 A | | 4/2012 | |
| CN | 102782565 A | | 11/2012 | |
| EP | 2221657 A1 | | 8/2010 | |
| JP | 2002-511594 | * | 4/2002 | ............... A61F 9/02 |
| JP | 2002-511594 A | | 4/2002 | |
| JP | 2008-058576 | * | 3/2008 | ............ G02C 13/00 |
| JP | 2008-058576 A | | 3/2008 | |
| WO | WO 2010-104182 | * | 3/2010 | ............... G02C 7/02 |
| WO | 2010/104182 A1 | | 9/2010 | |

OTHER PUBLICATIONS

Apr. 15, 2014 International Search Report issued in International Patent Application No. PCT/JP2014/055726.
May 16, 2016 Office Action issued in Australian Patent Application No. 2014231883.
Aug. 19, 2016 Office Action issued in Chinese Patent Application No. 201480016149.7.
Oct. 28, 2016 Search Report issued in European Patent Application No. 14763309.3.
Sep. 26, 2016 Office Action issued in Japanese Patent Application No. 2015-505427.
Feb. 14, 2017 Office Action issued in Chinese Patent Application No. 201480016149.7.
Jun. 8, 2017 Office Action issued in Japanese Patent Application No. 2015-505427.

\* cited by examiner

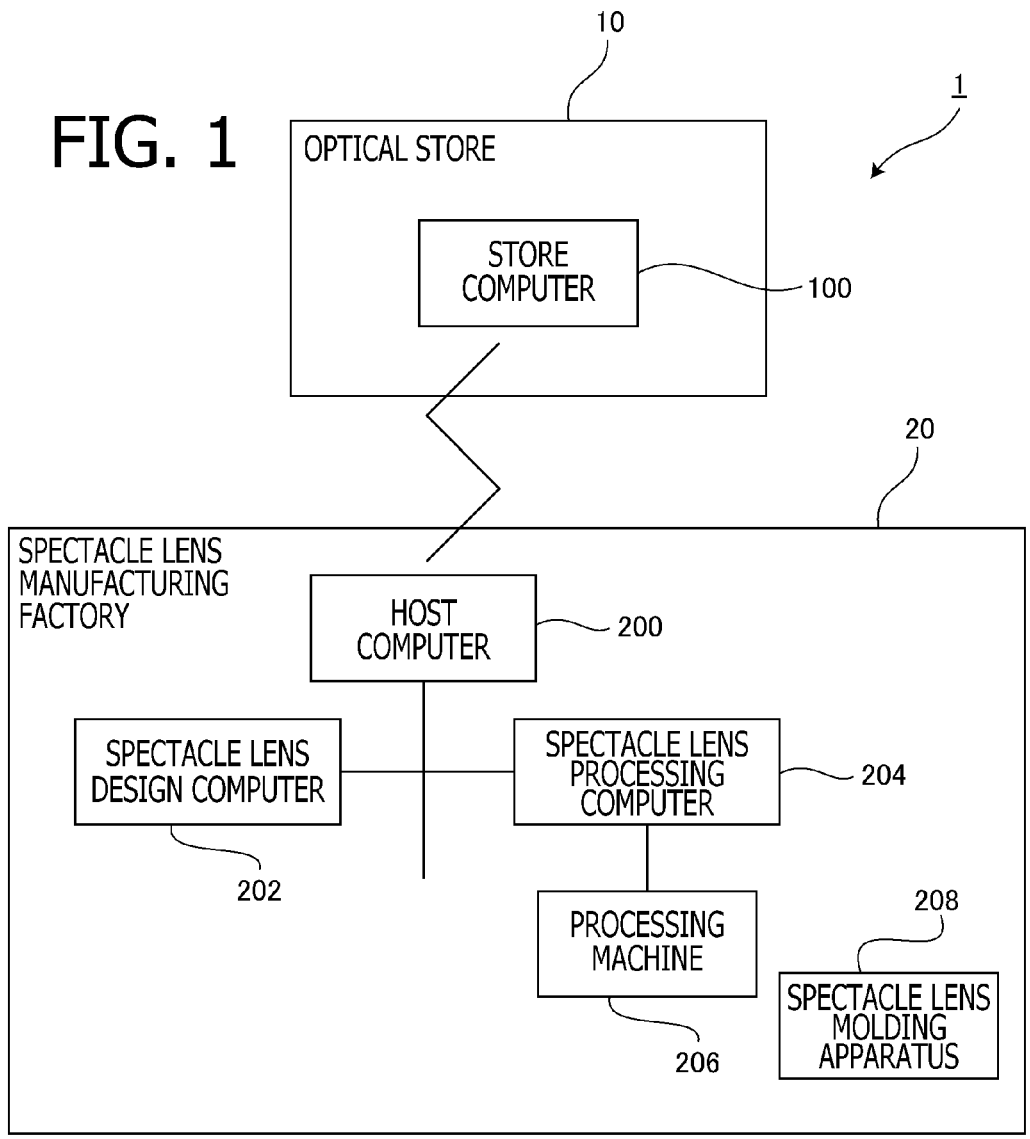
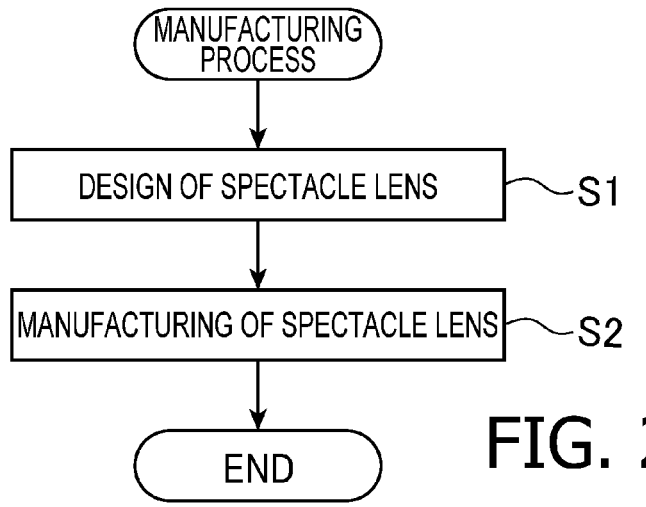

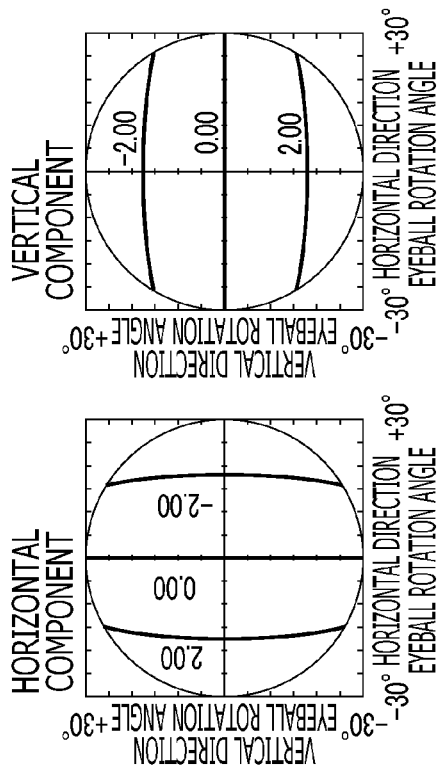
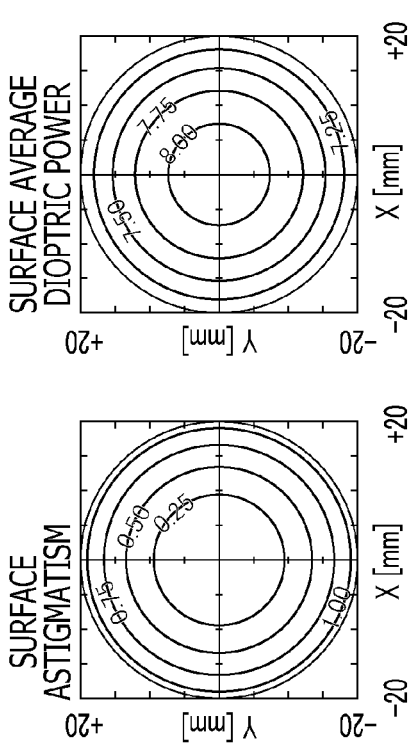
FIG. 7A
FIG. 7B
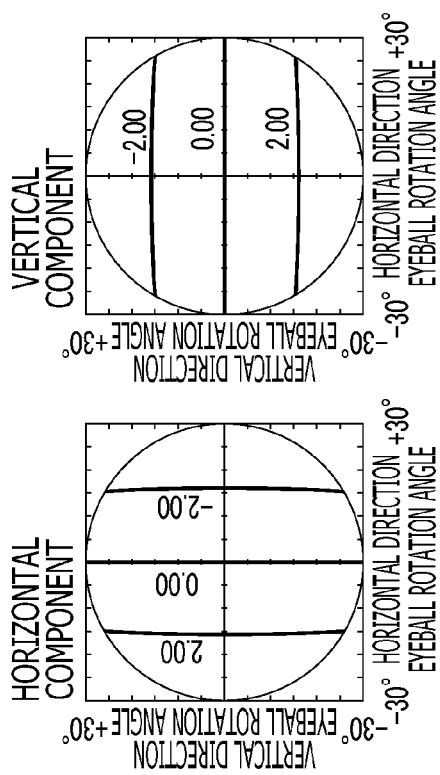
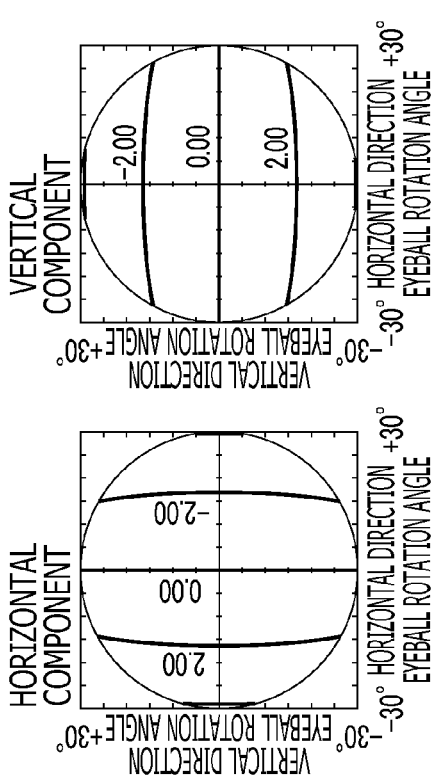
FIG. 7C
FIG. 7D

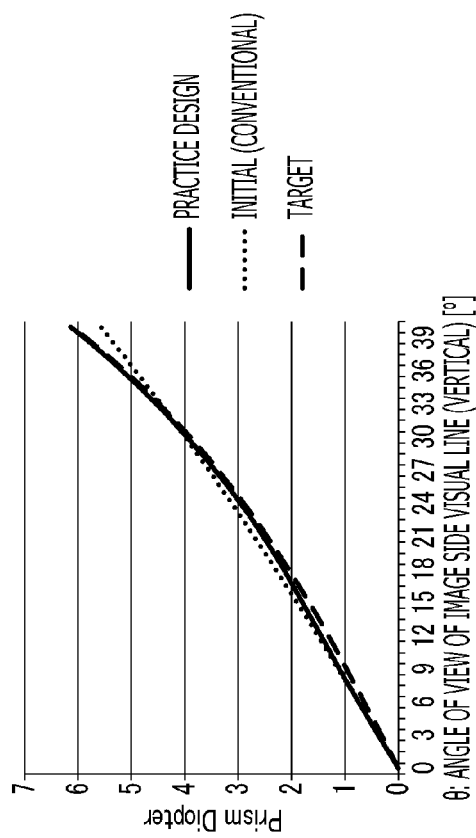
FIG. 8A
| θ (°) | PRACTICE DESIGN | INITIAL (CONVENTIONAL) | TARGET | DIFFERENCE BETWEEN PRACTICE DESIGN AND TARGET | DIFFERENCE BETWEEN INITIAL AND TARGET |
|---|---|---|---|---|---|
| 0 | 0 | 0 | 0 | 0 | 0 |
| 5 | 0.622 | 0.622 | 0.53 | 0.092 | 0.092 |
| 10 | 1.214 | 1.252 | 1.078 | 0.136 | 0.174 |
| 15 | 1.792 | 1.897 | 1.665 | 0.127 | 0.232 |
| 20 | 2.395 | 2.564 | 2.312 | 0.083 | 0.252 |
| 25 | 3.108 | 3.26 | 3.046 | 0.062 | 0.214 |
| 30 | 3.959 | 3.99 | 3.896 | 0.063 | 0.094 |
| 35 | 4.951 | 4.76 | 4.899 | 0.052 | -0.139 |
| 40 | 6.135 | 5.572 | 6.1 | 0.035 | -0.528 |
FIG. 8B
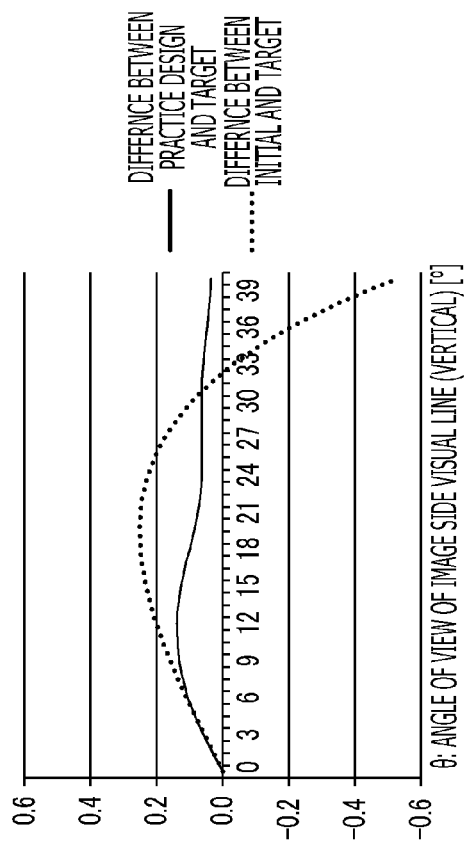
FIG. 8C
FIG. 8D
| θ (°) | PRACTICE DESIGN | | INITIAL (CONVENTIONAL) | |
|---|---|---|---|---|
| | AS | PE | AS | PE |
| 0 | 0.00 | -0.01 | 0.00 | 0.00 |
| 5 | 0.05 | -0.07 | 0.00 | 0.00 |
| 10 | 0.13 | -0.18 | 0.00 | -0.01 |
| 15 | 0.12 | -0.24 | 0.00 | -0.03 |
| 20 | 0.08 | -0.17 | 0.01 | -0.06 |
| 25 | 0.40 | 0.01 | 0.02 | -0.10 |
| 30 | 0.69 | 0.20 | 0.04 | -0.15 |
| 35 | 1.01 | 0.43 | 0.06 | -0.22 |
| 40 | 1.46 | 0.73 | 0.11 | -0.31 |

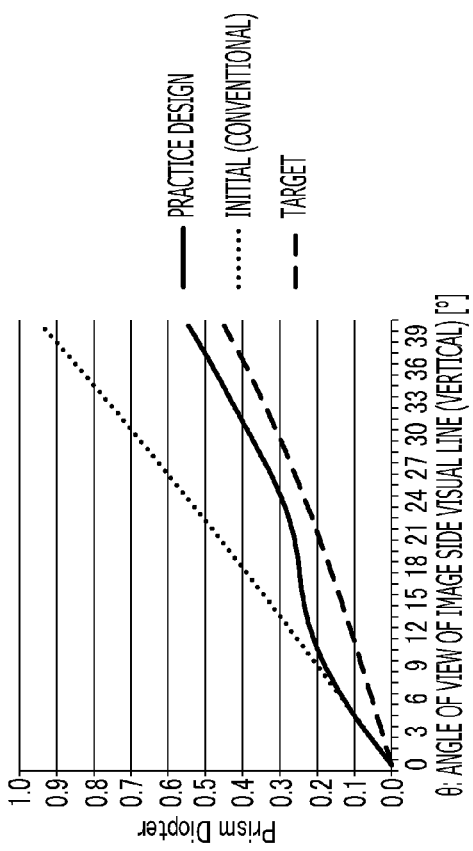
FIG. 11A
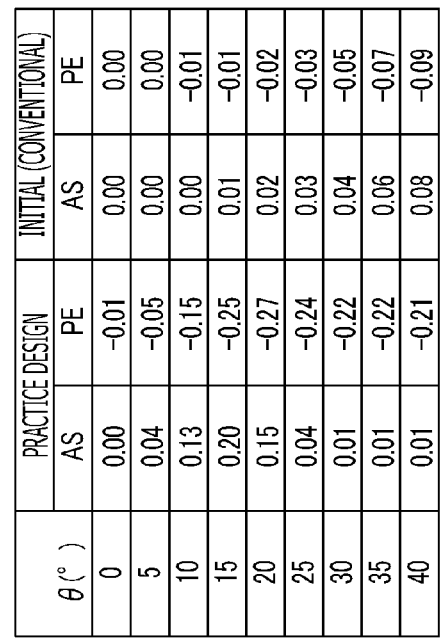
FIG. 11B
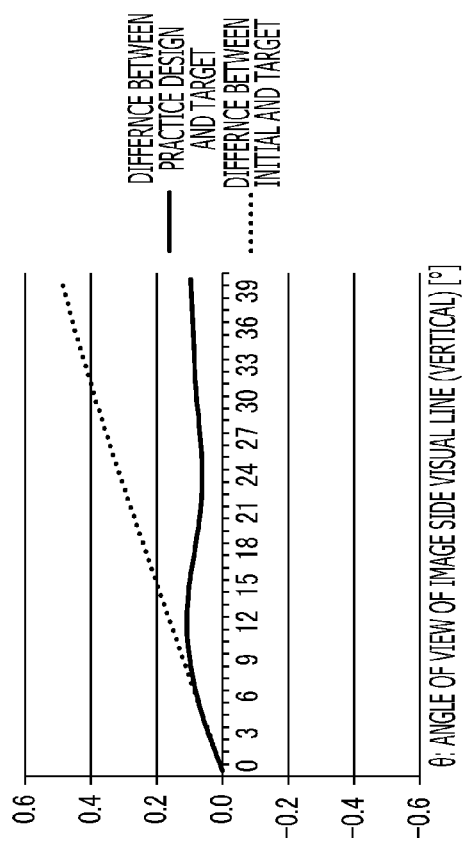
FIG. 11C
FIG. 11D

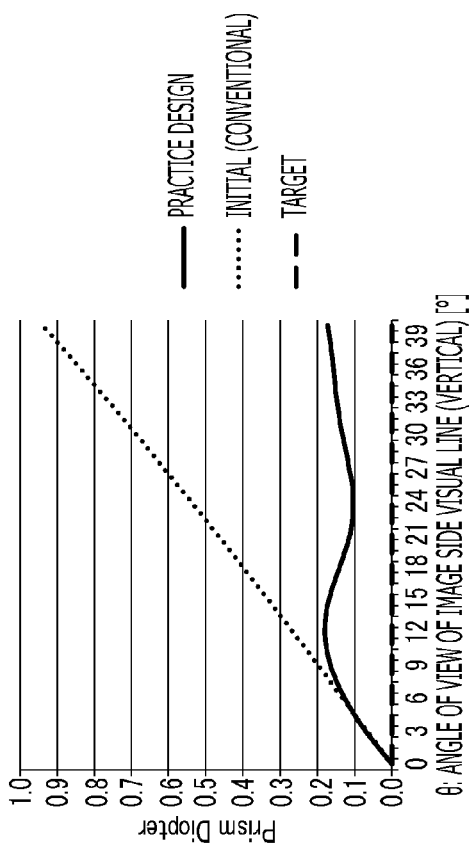
FIG. 14A
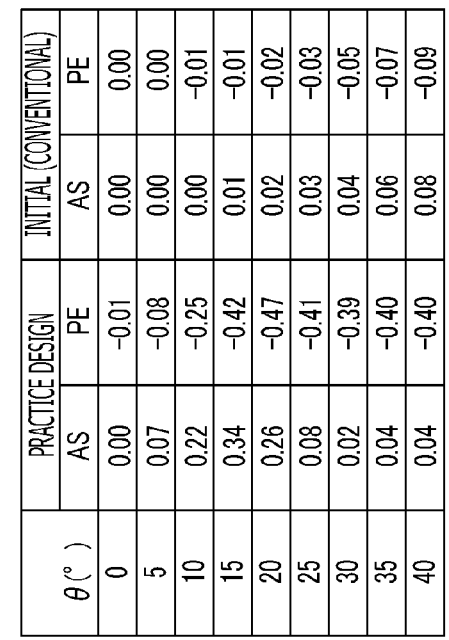
FIG. 14B
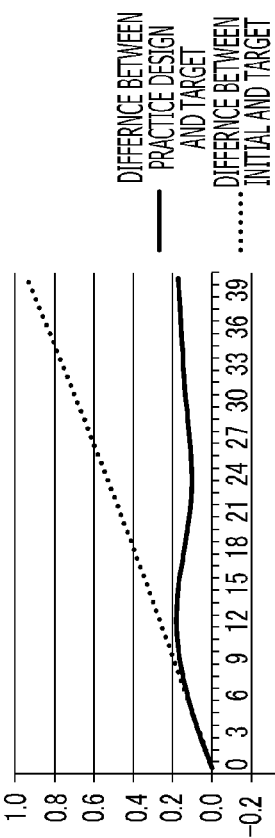
FIG. 14C
FIG. 14D

SPECTACLE LENS, MANUFACTURING METHOD THEREOF AND LENS SUPPLY SYSTEM

TECHNICAL FIELD

The present invention relates a spectacle lens suitable for reducing uncomfortable feeling which a wearer receives due to prismatic effect, a manufacturing method thereof and a lens supply system for supplying such spectacle lenses.

BACKGROUND ART

Wrap-around type spectacle lenses are widely used, for example, in the field of sport. The wrap-around type spectacle lenses are configured to have a wide width and to be curved along the face so that the spectacle lenses cover the face. By wearing such spectacle lenses having a large face form angle of a frame, the wearer is able to have advantageous effects, such as, expansion of the field of view, windbreak and control of laterally entering light. The wearer wears wrap-around type spectacle lenses with dioptric power or wrap-around type spectacle lenses without dioptric power depending on presence or absence of visual acuity correction.

As pointed out, for example, in US Patent Application Publication No. 2012/8089 (hereafter, referred to as "patent document 1"), regarding wrap-around type spectacle lenses of this type, the prismatic effect, astigmatism and the average dioptric power error which the wearer feels are different from usually used ordinary spectacle lenses formed by fitting a lens into a frame having a small face form angle. Therefore, there is a case where a wearer who is wearing wrap-around type spectacle lenses has uncomfortable feeling. The patent document 1 pays attention to the fact that conventional design does not consider reducing unbalance between left and right prismatic effects, and considers that the unbalance is the cause of uncomfortable feeling which the wearer receives. The patent document 1 proposes a method where, in order to reduce unbalance between the left and right prismatic effects, shape data of a lens rear surface (a concave surface) is corrected such that prismatic effects given, by an initial lens having a lens front angle, to a plurality of light rays including a frontward viewing direction and passing through a rotation enter of an eye assumed in optical design coincide with or approach prismatic effects given, by an initial lens not having a lens front angle, to the plurality of light rays. It should be noted that the lens front angle is an angle formed, in a horizontal direction, by a visual line defined to pass the rotation center of the eye when a person without spectacle lenses views a far point and a normal line to a lens front surface (a convex surface) at a fitting point.

SUMMARY OF THE INVENTION

As described above, in the patent document 1, technology suitable for reducing uncomfortable feeling given to the wearer when a wearer wears spectacle lenses having a large face form angle, such as, wrap-around type spectacle lenses, by reducing the unbalance between the left and right prismatic effects through use of the above described method. However, a demand for further reducing uncomfortable feeling given to a wearer constantly exists. For this reason, as a result of intensive studies, the inventor of the present invention has found that the causes of the uncomfortable feeling which a wearer has when the wearer wears wrap-around type spectacle lenses include not only the face form angle of a frame but also another factor.

The present invention is made considering the above described circumstances. That is, the object of the present invention is to provide spectacle lenses suitable for reducing uncomfortable feeling which a wearer has in a state of wearing wrap-around type spectacle lenses or the like, a manufacturing method thereof, and a lens supply system for supplying such spectacle lenses.

A lens supply system according to an embodiment of the invention comprises: an initial shape data obtaining means that obtains initial shape data of a spectacle lens; a shape data correcting means that corrects the initial shape data such that, when a base curve of an initial lens manufactured based on the initial shape data is defined as a first base curve, a predetermined lens having a second base curve lower than the first base curve is defined as a target spectacle lens, prismatic effects which light rays in respective visual line directions passing through a center of an eye assumed in optical design receive from the initial lens coincide with or approach prismatic effects which the light rays receive from the target spectacle lens; and a spectacle lens manufacturing means that manufactures a spectacle lens based on the corrected initial shape data.

The spectacle lens supplied by the lens supply system according to the embodiment of the invention is configured such that the prismatic effects which light rays in respective visual line directions passing through a center of an eye assumed in optical design receive from the initial lens coincide with prismatic effects which the light rays receive from the target spectacle lens, for example, even when the base curve of the spectacle lens is deep as in the case of the wrap-around type spectacle lens. Since the direction of the visual line through the lens defined when the wearer views a peripheral part through the spectacle lens does not change so much from the ordinary state, the wearer does not have uncomfortable feeling.

The lens supply system according to an embodiment of the invention may comprise: a shape measuring means that measures a shape of an ordinary spectacle lens which is defined as a spectacle lens which a wearer scheduled to wear the manufactured spectacle lens usually wears; and an ordinary spectacle lens data generating means that generates shape data of the ordinary spectacle lens based on a result of the measuring. In this case, the shape data correcting means corrects the initial shape data based on the shape data of the ordinary spectacle lens such that prismatic effects which the light rays in respective visual line directions passing through the center of the eye assumed in optical design receive from the initial lens coincide with or approach prismatic effects which the light rays receive from the ordinary spectacle lens. The lens supply system may comprise an inputting means that inputs a value of a base curve of the ordinary spectacle lens measured by the shape measuring means.

The lens supply system according to an embodiment of the invention may comprise a sample selecting means that selects a sample lens from a plurality of types of predetermined sample lenses. In this case, the shape data correcting means corrects the initial shape data based on shape data of the sample lens selected by the sample selecting means such that prismatic effects which the light rays in respective visual line directions passing through the center of the eye assumed in optical design receive from the initial lens coincide with or approach prismatic effects which the light rays receive from the sample lens selected by the sample selecting means.

A lens supply system according to an embodiment of the invention comprises: an initial shape data obtaining means that obtains initial shape data of a spectacle lens; and a shape data correcting means that corrects the initial shape data such that prismatic effects which light rays in respective visual line directions passing through a center of an eye assumed in optical design receive from the initial lens coincide with or approach a state of a naked eye not having prismatic effect.

The shape data correcting means may calculate a shift amount between the prismatic effects which the light rays receive from the initial lens and the prismatic effects which the light rays receive from the target spectacle lens, and corrects at least one of a convex surface and a concave surface of the initial lens such that the calculated shift amount falls within a predetermined tolerance.

The shape data correcting means may calculate a shift amount between the prismatic effects which the light rays receive from the initial lens and a state where the light rays do not receive prismatic effects, and corrects at least one of a convex surface and a concave surface of the initial lens such that the calculated shift amount falls within a predetermined tolerance.

The shape data correcting means may correct at least one of the convex surface and the concave surface of the initial lens such that the calculated shift amount in a peripheral region of the initial lens falls within the predetermined tolerance The center of the eye may be an eyeball rotation center or a center of an entrance pupil of the eye in a state of frontward viewing.

A spectacle lens according to an embodiment of the invention has a shape formed based on correction data obtained by correcting initial shape data, wherein the initial shape data is corrected such that, when a base curve of an initial lens manufactured based on the initial shape data is defined as a first base curve, a predetermined lens having a second base curve lower than the first base curve is defined as a target spectacle lens, prismatic effects which light rays in respective visual line directions passing through a center of an eye assumed in optical design receive from the initial lens coincide with or approach prismatic effects which the light rays receive from the target spectacle lens.

The spectacle lens according to an embodiment of the invention may have the shape formed based on the correction data obtained by correcting the initial shape data such that prismatic effects which the light rays in respective visual line directions passing through the center of the eye assumed in optical design receive from the initial lens coincide with or approach prismatic effects which the light rays receive from an ordinary spectacle lens which is defined as a lens which a wearer scheduled to wear the spectacle lens usually wears.

A spectacle lens according to an embodiment of the invention has a shape formed based correction data obtained by correcting initial shape data, wherein the initial shape data is corrected such that prismatic effects which light rays in respective visual line directions passing through a center of an eye assumed in optical design receive from an initial lens manufactured based on the initial shape data coincide with or approach a state of a naked eye not having prismatic effect.

A manufacturing method for a spectacle lens according to an embodiment of the invention comprises: an initial shape data obtaining step of obtaining initial shape data of a spectacle lens; a shape data correcting step of correcting the initial shape data such that, when a base curve of an initial lens manufactured based on the initial shape data is defined as a first base curve, a predetermined lens having a second base curve lower than the first base curve is defined as a target spectacle lens, prismatic effects which light rays in respective visual line directions passing through a center of an eye assumed in optical design receive from the initial lens coincide with or approach prismatic effects which the light rays receive from the target spectacle lens; and a spectacle lens manufacturing step of manufacturing the spectacle lens based on the corrected initial shape data.

According to the embodiment of the invention, spectacle lenses suitable for reducing uncomfortable feeling which a wearer has in a state of wearing spectacle lenses having a deep base curve, such as, wrap-around type spectacle lenses, a manufacturing method thereof, and a lens supply system for supplying such spectacle lenses are provided.

BRIEF DESCRIPTION OF THE DRAWINGS

FIG. 1 is a block diagram illustrating a configuration of a spectacle lens manufacturing system according to an embodiment of the invention.

FIG. 2 is a flowchart illustrating a manufacturing process for spectacle lenses in a spectacle lens manufacturing factory according to the embodiment of the invention.

FIGS. 7A, 7B and 7C respectively illustrate prism distribution of the initial lens model, prism distribution of the target lens model and prism distribution of a design lens model according to the example 1 of the invention, and FIG. 7D illustrates a concave surface (an inner surface) shape of the design lens model according to the example 1 of the invention.

FIG. 8A illustrates prismatic power in respective visual line directions of the example 1 of the invention, FIGS. 8B and 8C respectively graph the prismatic power and the difference in prismatic power shown in FIG. 8A, and FIG. 8D illustrates aberration in respective visual line directions of the example 1 of the invention.

FIG. 11A illustrates prismatic power in respective visual line directions of the example 2 of the invention, FIGS. 11B and 11C respectively graph the prismatic power and the difference in prismatic power shown in FIG. 11A, and FIG. 11D illustrates aberration in respective visual line directions of the example 2 of the invention.

FIG. 14A illustrates prismatic power in respective visual line directions of the example 2 of the invention, FIGS. 14B and 14C respectively graph the prismatic power and the difference in prismatic power shown in FIG. 14A, and FIG. 14D illustrates aberration in respective visual line directions of the example 3 of the invention.

EMBODIMENTS FOR CARRYING OUT THE INVENTION

Figure 3:
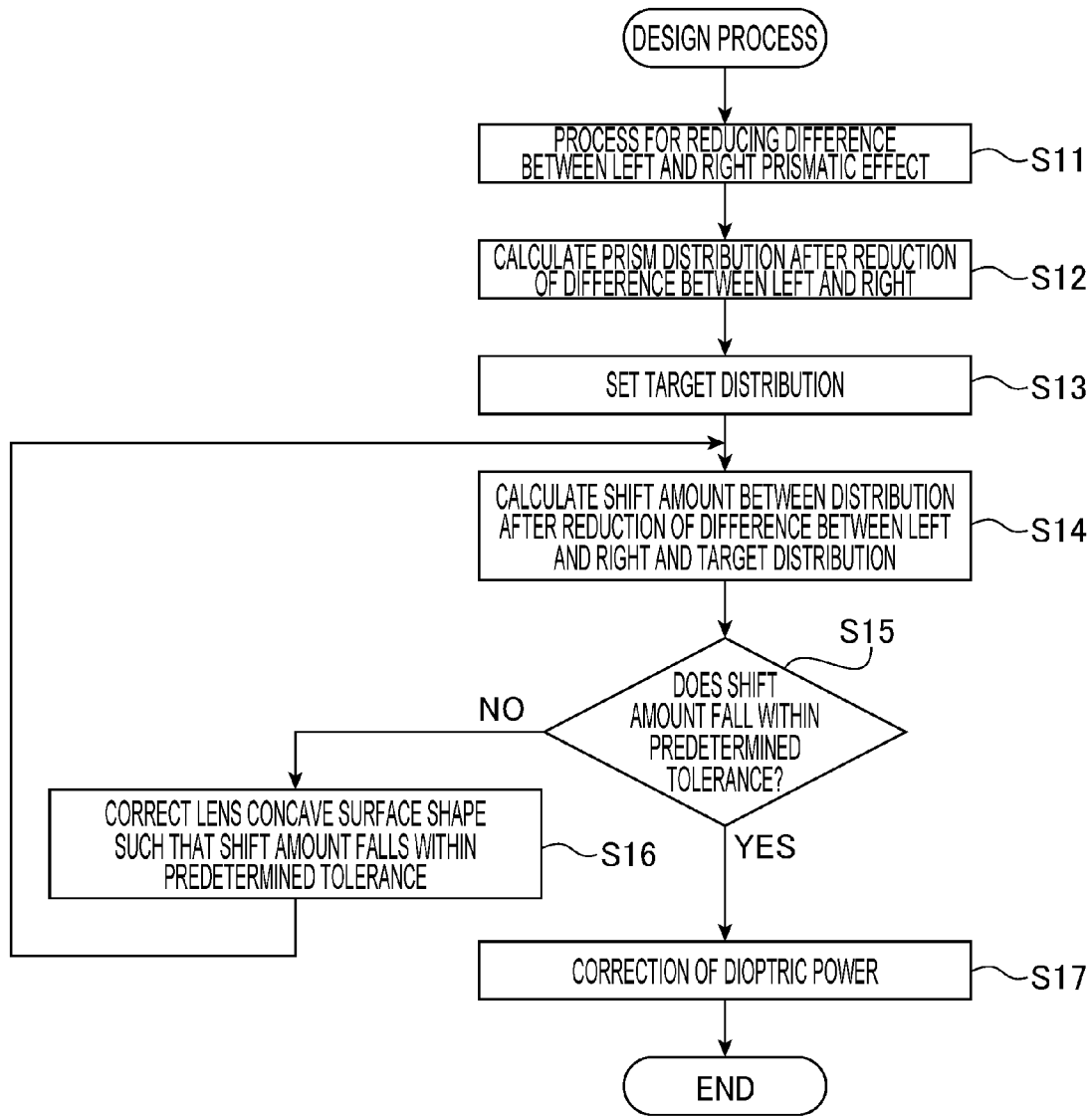
FIG. 3 is a flowchart illustrating a design process of spectacle lenses by a spectacle lens design computer according to the embodiment of the invention.

In the following, a spectacle lens manufacturing system (a spectacle lens supply system) according to an embodiment of the invention is described with reference to the accompanying drawings.

Spectacle Lens Manufacturing System 1

FIG. 1 is a block diagram illustrating a configuration of a spectacle lens manufacturing system 1 according to the embodiment. As shown in FIG. 1, the spectacle lens manufacturing system 1 includes an optical store 10 which orders spectacle lenses according to a prescription for a customer (a wearer), and a spectacle lens manufacturing factory 20 which manufactures spectacle lenses after receiving the order from the optical store 10. The order to the spectacle lens manufacturing factory 20 is issued through a predetermined network, such as the Internet, or data transmission by, for example, facsimile. Orderers may include ophthalmologists or general consumers.

Optical Store 10

In the optical store 10, a store computer 100 is installed. The store computer 100 is, for example, a general PC (Personal Computer), and software for ordering spectacle lenses to the spectacle lens manufacturing factory 20 has been installed in the store computer 100. To the store computer 100, lens data and frame data are input through an operation to a mouse or a keyboard by an optical store staff. The lens data includes, for example, a prescription (e.g., spherical power, cylindrical power, a cylindrical axis direction, prismatic power, prism base setting, an addition power and PD (Pupillary Distance) and the like), lens material, a refractive index, the type of optical design, a lens outer diameter, a lens thickness, a peripheral part thickness, decentering, a base curve, a wearing condition of spectacle lenses (a corneal vertex distance, a pantoscopic angle, a frame face form angle), the type of spectacle lens (a single-vision spherical lens, a single-vision aspherical lens, a multifocal lens (a bifocal lens or a progressive power lens)), coating (dyeing processing, hard coating, anti-reflection coating, ultraviolet light cutting and the like), and layout data according to a customer's request. The frame data includes shape data of a frame selected by a customer. The frame data is managed, for example, by barcode tags, and can be obtained by reading a barcode tag adhered to a frame by a barcode reader. The store computer 100 transmits the ordering data (the lens data and the frame data) to the spectacle lens manufacturing factory 20 via, for example, the Internet.

Spectacle Lens Manufacturing Factory 20

In the spectacle lens manufacturing factory 20, a LAN (Local Area Network) centering at a host computer 200 to which various terminal devices including a spectacle lens design computer 202 and a spectacle lens processing computer 204 are connected is constructed. Each of the spectacle lens design computer 202 and the spectacle lens processing computer 204 is a general PC. On the spectacle lens design computer 202 and the spectacle lens processing computer 204, a program for spectacle lens design and a program for spectacle lens processing are installed, respectively. To the host computer 200, the ordering data transmitted via the Internet is input from the store computer 100. The host computer 200 transmits the ordering data input thereto to the spectacle lens design computer 202.

Manufacturing of Spectacle Lenses in Spectacle Lens Manufacturing Factory 20

S1 in FIG. 2 (Design of Spectacle Lens)

FIG. 2 is a flowchart illustrating a manufacturing process for spectacle lenses in the spectacle lens manufacturing factory 20. In the spectacle lens design computer 202, a program for designing spectacle lenses in response to received order has been installed, and the spectacle lens design computer 202 creates design data based on ordering data (lens data) and creates and edge processing data based on the design data (frame data). Design of spectacle lenses using the spectacle lens design computer 202 is explained in detail later. The spectacle lens design computer 202 transfers the created lens design data and the edge processing data to the spectacle lens processing computer 204.

S2 in FIG. 2 (Manufacturing of Spectacle Lens)

The spectacle lens processing computer 204 reads the lens design data and the edge processing data transferred from the spectacle lens design computer 202, and drives and controls a processing machine 206.

Let us consider, for example, a case where a plastic spectacle lens is manufactured by a cast polymerization method. In this case, the processing machine 206 makes molding dies respectively corresponding to an outer surface (a convex surface) and an inner surface (a concave surface) of a lens by grinding and polishing material, such as metal, glass or ceramics, in accordance with the lens design data. The pair of molding dies thus made is disposed to face with each other at an interval corresponding to the thickness of the spectacle lens, and an adhesive tape is wound around an outer circumferential surface of the both molding dies so that the interval between the both molding dies is sealed. When the pair of molding dies is set on a spectacle lens molding apparatus 208, a hole is opened in a part of the adhesive tape, and lens material liquid is injected into a cavity (a sealed space between the both molding dies) through the hole. The lens material liquid injected and filled into the cavity is then polymerized and cured by heat or ultraviolet irradiation. As a result, a polymer (a lens base material) to which a peripheral shape defined by transfer surface shapes of the pair of molding dies and the adhesive tape has been transferred is obtained. The lens base material obtained by the cast polymerization method is then removed from the molding dies. The removed lens base material is then subjected to removal of residual stress by an annealing process, and various coatings, such as, dyeing processing, hard coating, anti-reflection coating and ultraviolet light cutting. Thus, spectacle lenses are completed and are delivered to the optical store 10.

In order to enhance productivity, in the spectacle lens manufacturing factory 20, the whole production range of dioptric powers is divided into a plurality of groups, and semi-finished lens blank groups having convex surface curve shapes (e.g., a spherical shape or an aspherical shape) and lens diameters complying with respective production ranges are prepared in advance in preparation for orders. The semi-finished lens blank is, for example, a resin blank or a glass blank of which convex and concave surfaces are an optical surface (a finished surface) and a non-optical surface (an unfinished surface), respectively. In this case, an optimum semi-finished lens blank is selected based on the lens data, and the selected semi-finished lens blank is set on the processing machine 206. The processing machine 206 grinds and polishes the concave surface of the semi-finished lens blank set on the processing machine 206, so as to make an uncut lens. The uncut lens of which concave surface shape has been made is then subjected to various coatings, such as, dyeing processing, hard coating, anti-reflection coating and ultraviolet light cutting. The outer circumferential surface of the uncut lens after being subjected to the various coatings is then subjected to the peripheral processing based on the edge processing data. The spectacle lenses processed into circular shapes are then delivered to the optical store 10.

Specific Design Method by Spectacle Lens Design Computer 202

As described above, as a result of intensive studies, the inventor of the present invention has found that the causes of the uncomfortable feeling which a wearer has when the wearer wears wrap-around type spectacle lenses include not only the face form angle (in other words, a lens front angle) of a frame but also another factor. Specifically, for the purpose of covering a face of the wearer to reach a side portion of the face, wrap-around type spectacle lenses are configured to have a deep base curve in comparison with normal spectacle lenses. Therefore, regardless of presence or absence of dioptric power, the difference in prismatic effect between a state of wearing the wrap-around type spectacle lenses and an ordinary state (e.g., a state of wearing ordinary spectacle lenses having a shallow base curve or a state of naked eyes) is large. For this reason, when the wearer views a peripheral part in a state of wearing the wrap-around type spectacle lenses, the wearer has uncomfortable feeling because a direction of a visual line through the lens is largely different from that of the ordinary state. For example, regarding a sport requiring accurate visual measurement, such as, patting of golf, the fact that a visual line through the spectacle lens is different from that of the ordinary state might cause fatal mistake. Some sunglasses are configured to have deeper base curves in comparison with ordinary spectacle lenses, for example, in order to emphasize fashionability (it should be noted that the frame face form angle of sunglasses ranges from a small angle to a large angle). It is considered that the wearer has uncomfortable feeling also when the wearer views a peripheral part in a state of wearing spectacle lenses because the visual line through the spectacle lens is different from that of the ordinary state. As described above, the inventor of the present invention has found that a base curve is one of the causes giving uncomfortable feeling to a wearer and the base curve causes the uncomfortable feeling independently from the frame face form angle (in other words, the lens front angle) regardless of presence or absence of dioptric power.

FIG. 3 is a flowchart illustrating a design process of spectacle lenses by the spectacle lens design computer 202. According to the design process, regarding spectacle lenses having deep base curves, such as, wrap-around type spectacle lenses, the uncomfortable feeling given to wearers can be reduced. Spectacle lenses designed according to the design process include not only spectacle lenses prescribed with a dioptric power for correcting visual acuity of a wearer but also spectacle lenses not aiming at correction of visual acuity (e.g., sport-glasses or sunglasses not having dioptric power). Furthermore, spectacle lenses designed according to the design process include not only spectacle lenses fitting into a frame having a large face from angle, such as, wrap-around type spectacle lenses, but also spectacle lenses fitted into a flat frame whose face from angle is small. It should be noted that, in the following explanation about the design process, design of wrap-around type spectacle lenses prescribed with dioptric power is exemplified.

S11 in FIG. 3 (Reduction of Difference Between Left and Right Prismatic Effects by Lens Front Angle)

As described in the patent document 1, wrap-around type spectacle lenses have the difference between the left and right in prismatic effects caused by the lens front angle. The spectacle lens design computer 202 executes the following process to reduce the difference between the left and right prismatic effects. The details of the process can be seen in the patent document 1. Regarding the case where spectacle lenses whose difference between the left and right prismatic effects by the frame face form angle (in other words, the lens face form angle) is substantially negligible, processes from the process 3 to the process 8-2 in the step S11 can be omitted.

Process 1—S11 in FIG. 3

In the process, an initial lens is designed based on the lens data. The initial lens is designed in a state of not having a lens front angle.

Figure 4A:
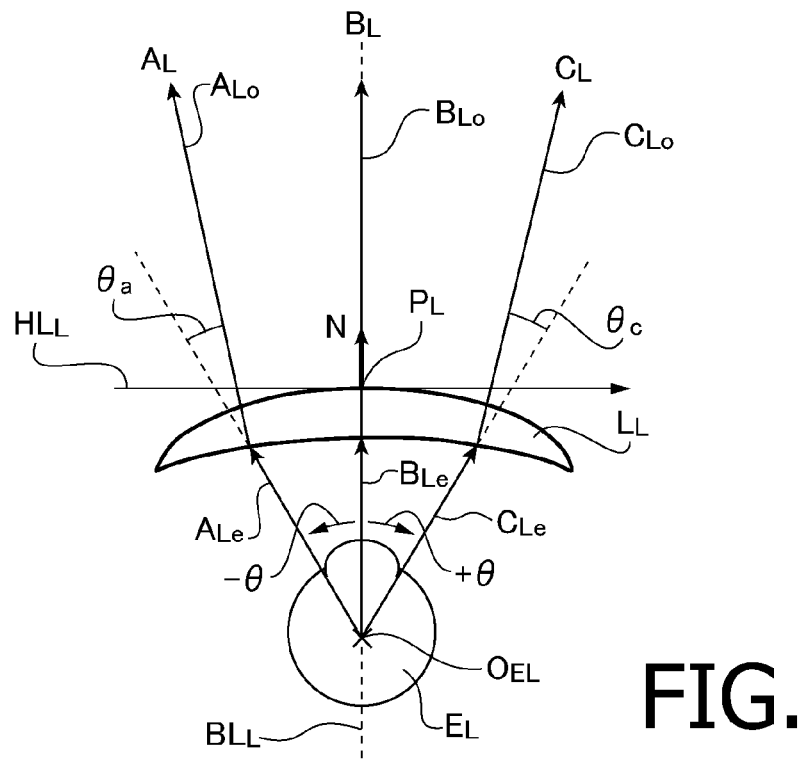
FIGS. 4A and 4B illustrate virtual optical models assuming a lens wearing state before and after setting a lens front angle, in which an eyeball and a spectacle lens are disposed.

Explanation about FIG. 4A

FIG. 4A illustrates a virtual optical model constructed for design of the initial lens, and in the virtual optical model, an eyeball and an initial lens are provided assuming a lens wearing state (assumed for optical design). In this embodiment, a virtual optical model for the left eye is explained by way of example, and explanation for the right eye is omitted to avoid redundant explanation. In the following, each drawing illustrating a virtual optical model is presented such that an eyeball model $E_L$ corresponding to the left eye is viewed from an overhead side as exemplified in FIG. 4A. Since each virtual optical model corresponds to the left eye, each reference symbol assigned a subscript L. As shown in FIG. 4A, the eyeball model $E_L$ is disposed in the virtual optical model. As the eyeball model $E_L$, a suitable model is selected and disposed based on the prescription (a spherical power and a cylindrical power) of the wearer contained in the ordering data. A lens model (an initial lens) $L_L$ is disposed at a position spaced by a vertex distance with respect to the eyeball model $E_L$. In FIG. 4A, a reference symbol $P_L$ denotes a fitting point located on a lens convex surface. A reference symbol $O_{EL}$ denotes an eyeball rotation center. A reference symbol $BL_L$ denotes a reference frontward visual line connecting the fitting point $P_L$ with the eyeball rotation center $O_{EL}$. The reference frontward visual line $BL_L$ coincides with a visual line passing through the eyeball rotation center when a far point is viewed in a state of not wearing spectacle lenses. A reference symbol $HL_L$ denotes a horizontal axis perpendicularly intersecting with the reference frontward visual line $BL_L$ at the fitting point $P_L$. The lens model (the initial lens) $L_L$ is disposed such that a normal to the lens convex surface at the fitting point $P_L$ coincides with the reference frontward visual line $BL_L$ in a horizontal cross sectional plane including the fitting point $P_L$. In the horizontal cross sectional plane including the fitting point PL, the state where the normal N coincides with the reference frontward visual line $BL_L$ corresponds to a state of not having a lens front angle (see FIG. 4A), and the state where the normal N does not coincide with the reference frontward visual line $BL_L$ corresponds to a state of having a lens front angle (see FIG. 4B explained later). Furthermore, reference symbols $A_L$, $B_L$, $C_L$ respectively denote visual lines of the left eye in a state of wearing the lens model (the initial lens) $L_L$. Reference symbols $A_{Le}$, $B_{Le}$, $C_{Le}$ respectively denote image side visual lines of the visual lines $A_L$, $B_L$, $C_L$. The image side visual line represents a part of the visual line from the eyeball rotation center $O_{EL}$ to the lens model $L_L$. Reference symbols $A_{Lo}$, $B_{Lo}$, $C_{Lo}$ respectively denote object side visual lines of the visual lines $A_L$, $B_L$, $C_L$. The object side visual line represents a part of the visual line extending to the outside from the lens model $L_L$. As shown in FIG. 4A, the image side visual line $A_{Le}$ is inclined in the left direction by an angle θ with respect to the image side visual line $B_{Le}$, and the image side visual line $C_{Le}$ is inclined in the right direction by an angle θ with respect to the image side visual line $B_{Le}$. The image side visual line $B_{Le}$ in a state of frontward viewing coincides with the reference frontward visual line $BL_L$.

Process 2—S11 in FIG. 3

The prismatic effects which the plurality of visual lines passing through the eyeball rotation center $O_{EL}$ including the frontward viewing direction receive from the lens model (the initial lens) $L_L$ are calculated. The calculation result represents distribution of values of the prismatic effect at each point on the lens model (the initial lens) $L_L$. Hereafter, this distribution is referred to as "initial distribution". Although, in this embodiment, a visual line and a light ray are defined with reference to the eyeball rotation center $O_{EL}$, in another embodiment, a visual line and a light ray may be defined with reference to the center of an entrance pupil defined in a state of frontward viewing.

Process 3—S11 in FIG. 3

The lens front angle is set for the lens model (the initial lens) $L_L$ based on the frame data.

Process 4—S11 in FIG. 3

The lens model (the initial lens) $L_L$ is corrected such that the prismatic effect which the light ray passing the eyeball rotation center $O_{EL}$ in the frontward viewing direction receives from the lens model (the initial lens) $L_L$ after setting of the lens front angle coincides with (or approaches) the prismatic effect which the light ray passing the eyeball rotation center $O_{EL}$ in the frontward viewing direction receives from the lens model (the initial lens) $L_L$ before setting of the lens front angle. In this case, the direction of the lens concave surface with respect to the lens convex surface is corrected. In the following, this correction is referred to as "direction correction", and the lens model $L_L$ after the direction correction is referred to as a "lens model (after direction correction) $L_L$".

Process 5—S11 in FIG. 3

The prismatic effects which more than one light rays other than the frontward direction passing through the eyeball rotation center $O_{EL}$ receive from the lens model (after direction correction) $L_L$ are calculated. The calculation result represents distribution of values of the prismatic effects at respective points on the lens model (after direction correction) $L_L$. Hereafter, this distribution is referred to as a "distribution after correction".

Process 6—S11 in FIG. 3

A shift amount of the prismatic effect of the distribution after correction with respect to the initial distribution is calculated.

Process 7—S11 in FIG. 3

It is judged whether the shift amount of the prismatic effect of the distribution after correction with respect to the initial distribution falls within a tolerance. When the shift amount does not fall within the tolerance, the process proceeds to process 8-1. When the shift amount falls within the tolerance, the process proceeds to process 8-2.

Process 8-1—S11 in FIG. 3

The concave surface shape of the lens model (after direction correction) $L_L$ is corrected to decrease the shift amount. After the concave surface shape of the lens model (after direction correction) $L_L$ is corrected, the process returns to the process 6.

Process 8-2—S11 in FIG. 3

The concave surface shape of the lens model $L_L$ is corrected such that the refractive power for light acting on the eye along the visual line passing through the eyeball rotation center $O_{EL}$ and a predetermined refractive power measurement point in a state where the lens front angle is set coincides with the prescription. As a result, the lens model $L_L$ (hereafter, referred to as a "lens model (with reduced difference between left and right) $L_L$") whose difference between the left and right prismatic effects by the lens front angle is reduced is completed.

Figure 4B:
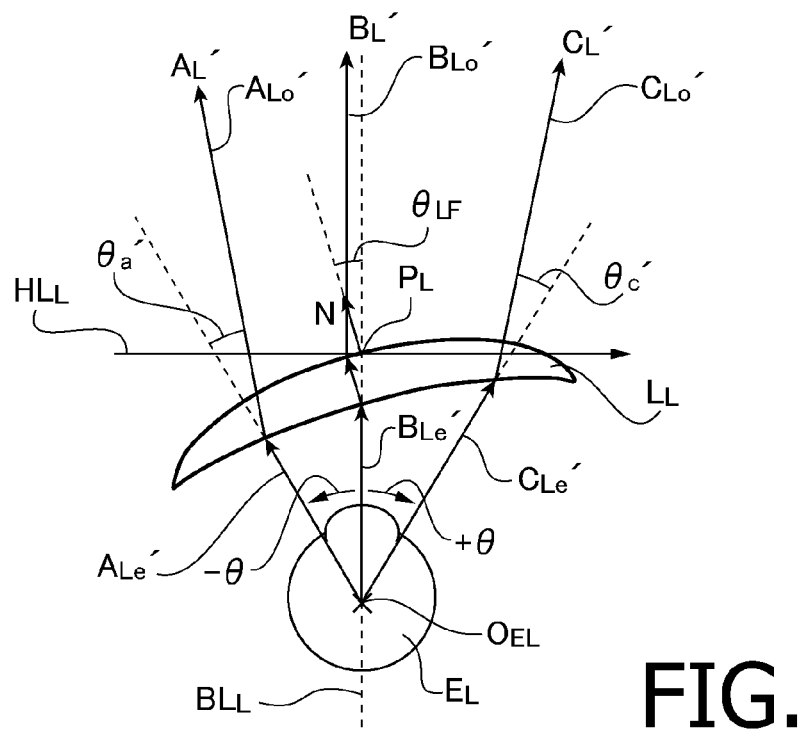

Explanation about FIG. 4B

FIG. 4B illustrates a virtual optical model in which the eyeball model $E_L$ and the lens model (with reduced difference between left and right) $L_L$ are disposed. In FIG. 4B, reference symbols $A_L'$, $B_L'$, $C_L'$ respectively denote visual lines of the left eye in a state of wearing the lens model (with reduced difference between left and right) $L_L$. Reference symbols $A_{Le}'$, $B_{Le}'$, $C_{Le}'$ respectively denote image side visual lines of the visual lines $A_L'$, $B_L'$, $C_L'$. Reference symbols $A_{Lo}'$, $B_{Lo}'$, $C_{Lo}'$ respectively denote object side visual lines of the visual lines $A_L'$, $B_L'$, $C_L'$. A reference symbol $θ_{LF}$ represents the lens front angle which is an angle formed in the horizontal direction by the normal N and the reference frontward visual line $BL_L$. As shown in FIG. 4B, the lens model (with reduced difference between left and right) $L_L$ is disposed such that the fitting point $P_L$ is located on the reference frontward visual line $BL_L$, and the normal N and the reference frontward visual line $BL_L$ forms the lens front angle $θ_{LF}$. Furthermore, as in the case of the $B_{Le}$ (see FIG. 4A), the image side visual line $B_{Le}'$ coincides with the reference frontward visual line $BL_L$ as shown in FIG. 4B. As in the case of the visual line $A_{Le}$ (see FIG. 4A), the visual line $A_{Le}'$ is inclined in the left direction by an angle θ with respect to the image side visual line $B_{Le}'$. As in the case of the visual line $C_{Le}$ (see FIG. 4A), the visual line $C_{Le}'$ is inclined in the right direction by an angle θ with respect to the image side visual line $B_{Le}'$. The direction of the object side visual line $B_{Lo}'$ coincides with the direction of the object side visual line $B_{Lo}$ (see FIG. 4A) although the positon of the object side visual line $B_{Lo}'$ is different from the object side visual line $B_{Lo}$.

When an angle formed between the image side visual line $A_{Le}$ and the object side visual line $A_{Lo}$ is defined as an angle $θ_a$ in FIG. 4A and an angle formed between the image side visual line $A_{Le}'$ and the object side visual line $A_{Lo}'$ is defined as an angle $θ_a'$ in FIG. 4B, the angle $θ_a$ becomes equal to the angle $θ_a'$. Furthermore, when an angle formed between the image side visual line $C_{Le}$ and the object side visual line $C_{Lo}$ is defined as an angle $θ_c$ in FIG. 4A and an angle formed between the image side visual line $C_{Le}'$ and the object side visual line $C_{Lo}'$ is defined as an angle $\theta_c'$ in FIG. 4B, the angle $\theta_c$ becomes equal to the angle $\theta_c'$. That is, the directions of the object side visual lines $A_{Lo}$, $C_{Lo}$ in FIG. 4A respectively coincide with the directions of the object side visual lines $A_{Lo}'$ and $C_{Lo}'$.

By thus executing the step S11, the shape data of the lens concave surface is corrected. Specifically, the shape data of the lens concave surface is corrected such that the prismatic effects which the light rays of the respective visual lines receive from the lens model (with reduced difference between left and right) $L_L$ having the lens front angle $\theta_{LF}$ coincide with the prismatic effects which the light rays of the respective visual lines receive from the lens model (the initial lens) $L_L$ having the lens front angel of zero. With this correction, the difference in the left and right prismatic effects by the lens front angle is reduced. However, in this situation, a large difference in prismatic effect with respect to the ordinary state (e.g., a state of wearing spectacle lenses having a shallow base curve or in a state of naked eyes) still exists in a peripheral part of the lens. Therefore, it is considered that, when the wearer views a peripheral part, the wearer has uncomfortable feeling because the visual line is largely different from the ordinary state.

S12 in FIG. 3 (Calculation of Prism Distribution after Reduction of Difference Between Left and Right)

The spectacle lens design computer 202 calculates distribution of values of the prismatic effect of the lens model (with reduced difference between left and right) $L_L$ completed in step S11 (reduction of difference between left and right prismatic effects by lens front angle) in FIG. 3. Hereafter, this distribution is referred to as a "distribution after reduction of difference between left and right".

S13 in FIG. 3 (Setting of Target Distribution)

The spectacle lens design computer 202 sets distribution of values of targeted prismatic effect such that the prismatic effect which the wearer feels in a state of wearing wrap-around type spectacle lenses becomes equal to the prismatic effect in the ordinary state. Hereafter, the targeted prismatic effect is referred to as a "target distribution". In the following, three examples for setting the target distribution are presented.

Setting Manner 1 for Target Distribution

The optical store staff measures the shape (e.g., a base curve) of spectacle lenses which the wearer usually wears by using a measuring device (not shown) installed in the optical store 10. In the following, the spectacle lenses which the wearer usually wears are referred to as "ordinary spectacle lenses". Data of the base curve and the so on collected by the measurement is input to the store computer 100. In general, the ordinary spectacle lens has a shallower base curve than a wrap-around type spectacle lens (i.e., the ordinary spectacle lens have a so-called flat base curve). The store computer 100 calculates distribution of values of prismatic effect of the wearer's ordinary spectacle lenses based on the measured data, and transmits the calculated distribution to the spectacle lens manufacturing factory 20 via the Internet. The spectacle lens design computer 202 receives, via the host computer 200, the distribution of the values of the prismatic effect of the ordinary spectacle lenses calculated by the store computer 100, and sets the received distribution as the target distribution. It should be noted that the measuring device are not necessarily required to obtain the base curve of the ordinary spectacle lens. For example, there is a case where the base curve of the ordinary spectacle lens is known. Specifically, when a product name of the wearer's ordinary spectacle lenses is known from, for example, medical records, the optical store staff may obtain a value of a base curve of the ordinary spectacle lens from, for example, a catalog of the product. The store staff may determine a value of a base curve of the ordinary spectacle lens by making use of his/her experience.

Setting Manner 2 for Target Distribution

The setting manner 2 is useful in the case where the shape of the wearer's ordinary spectacle lenses cannot be measured. Specifically, in a memory of the spectacle lens design computer 202, a plurality of types of target distributions are stored. The plurality of types of target distributions respectively correspond to distributions of prismatic effects obtained in states of wearing different sample lenses. The sample lenses are lenses prepared by assuming ordinary spectacle lenses, and have so-called flat base curves. In order to support various wearers, the plurality of types of assumed sample lenses have different base curves and lens diameters, for example. The spectacle lens design computer 202 selects a sample lens (target distribution) most suitable for the wearer from among the plurality of types of sample lenses (target distributions) based on the lens data.

Setting Manner 3 for Target Distribution

The above described setting matters 1 and 2 target wearers who usually wear spectacle lenses. By contrast, the setting manner 3 is useful for a person who is usually in a state of naked eyes. Specifically, the spectacle lens design computer 202 sets, as a target distribution, the state of naked eyes (i.e., distribution of prismatic effect of zero over the entire region before the person's eyes).

S14 in FIG. 3 (Calculation of Shift Amount)

The spectacle lens design computer 202 calculates a shift amount between the distribution after reduction of difference between left and right calculated in step S12 in FIG. 3 and the target distribution set in step S13 (setting of target distribution) in FIG. 3.

S15 in FIG. 3 (Judgment on Shift Amount)

The spectacle lens design computer 202 judges whether or not the shift amount calculated in step S14 (calculation of shift amount) in FIG. 3 falls within a predetermined tolerance. For example, it is judged whether or not the shift amounts at all of predetermined evaluation points fall within the predetermined tolerance. When at least one of the evaluation points does not fall within the predetermined tolerance (S15 in FIG. 3: NO), the process proceeds to step S16 (correction of lens concave surface) in FIG. 3. When all of the evaluation points fall within the predetermined tolerance (S15 in FIG. 3: YES), the process proceeds to step S17 (correction of dioptric power).

As another embodiment, the spectacle lens design computer 202 may judge whether a sum of the shift amounts at the predetermined evaluation points falls within a predetermined tolerance. The evaluation points may be distributed over the entire lens or may be disposed only in a particular region (e.g., a peripheral region of a lens through which a visual line defined when the wearer views a peripheral part passes). As the predetermined tolerance, different values may be set between evaluation points of preliminary divided regions (e.g., a frontward view region and a peripheral region).

S16 in FIG. 3 (Correction of Lens Concave Surface Shape)

The spectacle lens design computer 202 corrects the concave surface shape of the lens model (with reduced difference between left and right) $L_L$ so that the shift amount falls within the predetermined tolerance. Specifically, the concave surface shape is corrected such that the prismatic effect which the light rays passing through the eyeball rotation center $O_{EL}$ receive from the lens model (with reduced difference between left and right) $L_L$ coincides with (or approaches) the prismatic effect which the light rays passing through the eyeball rotation center $O_{EL}$ receive from the ordinary spectacle lenses or the sample lens (or a state of naked eyes not having prismatic effect). After correction of the concave surface shape, the process returns to step S14 (calculation of shift amount) in FIG. 3, and the spectacle lens design computer 202 executes again step S14 (calculation of shift amount) and step S15 (judgment on shift amount) in FIG. 3. Hereafter, the lens model $L_L$ whose concave surface shape is corrected in step S16 is referred to as a "lens model (with corrected concave surface shape) $L_L$". By repeating steps from step S14 (calculation of shift amount) in FIG. 3 to S16 (correction of lens concave surface shape) in FIG. 3, the shift amount converges to a value falling within the predetermined tolerance.

S17 in FIG. 3 (Correction of Dioptric Power)

The spectacle lens design computer 202 corrects the concave surface shape of the lens model (with corrected concave surface shape) $L_L$ such that the refractive power for light acting on the eye along a visual line passing through the eyeball rotation center $O_{EL}$ and a predetermined refractive power measurement point coincides with the prescription. As a result, wrap-around type spectacle lenses configured such that the prismatic effect which the eyes of the wearer feel coincides with (or approaches) the prismatic effect in the ordinary state (e.g., a state of wearing ordinary spectacle lenses or sample lenses or a state of naked eyes) are completed.

Figure 5A:
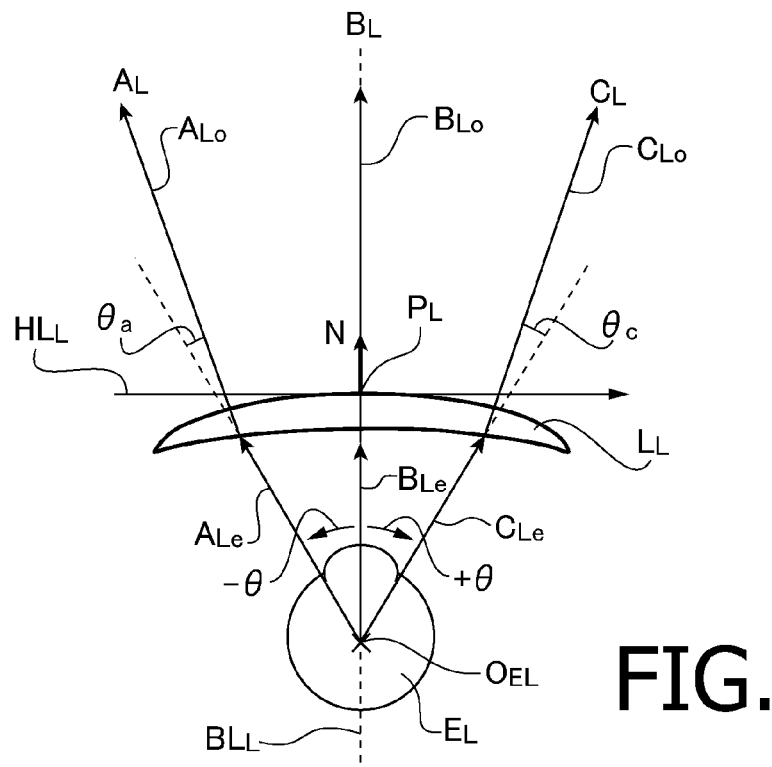
FIG. 5A illustrates a virtual optical model assuming a wearing state of ordinary spectacle lenses.
Figure 5B:
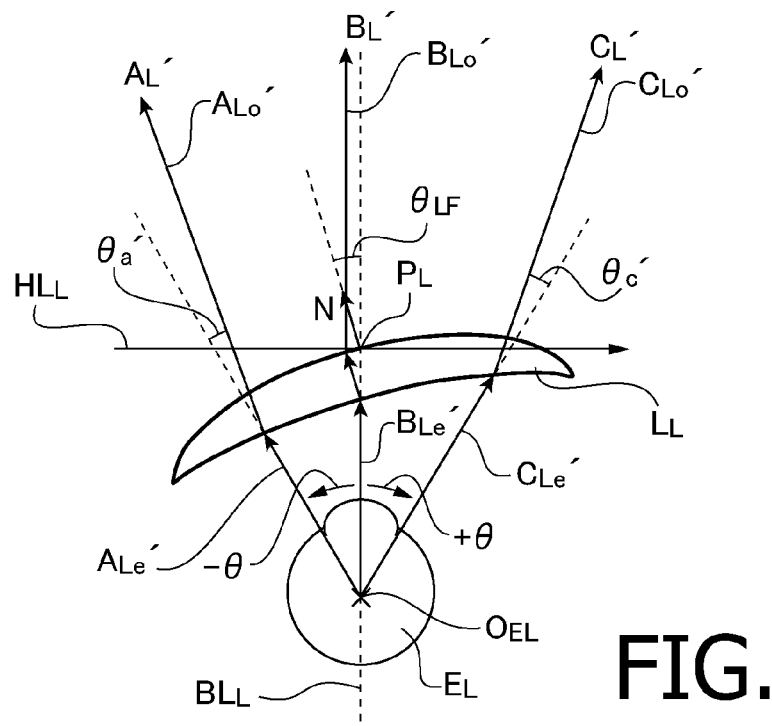
FIG. 5B illustrates a virtual optical model assuming a wearing state of a design lens according to the embodiment of the invention.

FIG. 5A illustrates a virtual optical model in which the eyeball model $E_L$ and the ordinary spectacle lens model $L_L$ are provided assuming a wearing state of the ordinary spectacle lenses (having a shallow base curve and has almost no lens front angle (in other words, a frame face form angle)), and in FIG. 5A the same reference symbols as those of FIG. 4A are assigned. FIG. 5B illustrates a virtual optical model in which the eyeball model $E_L$ and the spectacle lens model $L_L$ designed in the design process shown in FIG. 3 are disposed, and in FIG. 5B the same reference symbols as those of FIG. 4B are assigned. As shown in FIGS. 5A and 5B, an angle $\theta_a$ (see FIG. 5A) formed between the image side visual line $A_{Le}$ and the object side visual line $A_{Lo}$ is equal to an angle $\theta_a'$ (see FIG. 5B) formed between the image side visual line $A_{Le}'$ and the object side visual line $A_{Lo}'$. Furthermore, the direction of the object side visual line $B_{Lo}$ (see FIG. 5A) is equal to the direction of the object side visual line $B_{Lo}'$ (see FIG. 5B). Furthermore, an angle $\theta_c$ (see FIG. 5A) formed between the image side visual line $C_{Le}$ and the object side visual line $C_{Lo}$ is equal to an angle $\theta_c'$ (see FIG. 5B) formed between the image side visual line $C_{Le}'$ and the object side visual line $C_{Lo}'$. That is, the directions of the object side visual lines $A_{Lo}$, $B_{Lo}$, $C_{Lo}$ (see FIG. 5A) are equal to the directions of the object side visual lines $A_{Lo}'$, $B_{Lo}'$, $C_{Lo}'$ (see FIG. 5B), respectively. It is understood that, by thus executing the design process shown in FIG. 3, the prismatic effect (see FIG. 5B) which the light rays of the respective visual lines passing through the eyeball rotation center $O_{EL}$ receive from the lens model $L_L$ having a deep base curve becomes equal to the prismatic effect (see FIG. 5A) which the light rays of the respective visual lines receive from the ordinary spectacle lenses. Since the prismatic effect which the eyes feel in a state of wearing wrap-around type spectacle lenses coincides with or approximates the prismatic effect which the eyes feel in a state of wearing the ordinary spectacle lenses, the directions of visual lines through the lens are approximately equal to the visual lines of the ordinary state even when the wearer views a peripheral part in a state of wearing wrap-around type spectacle lenses. Accordingly, the wearer does not have uncomfortable feeling.

Hereafter, three examples (examples 1 to 3) of spectacle lenses (hereafter, referred to as "practice design lens") obtained by executing the design process shown in FIG. 3 are explained.

Example 1

The lens model (the initial lens) $L_L$ according to the example 1 is a lens having a dioptric power and a deep base curve, and has the lens front angle (the frame face from angle) of zero. As an example of such a lens, sunglasses designed to have a deep base curve and a dioptric power are assumed. The target in the example 1 is an ordinary spectacle lens configured such that the ordinary spectacle lens is prescribed with the same dioptric power as that of the lens model (the initial lens) $L_L$, and the ordinary spectacle lens has a shallower base curve than that of the lens model (the initial lens) $L_L$ and has the lens front angle of zero. The word "lens having a dioptric power" means a lens for correcting visual acuity, and denotes a lens prescribed with a spherical power, a cylindrical power and so on.

Figure 6A:
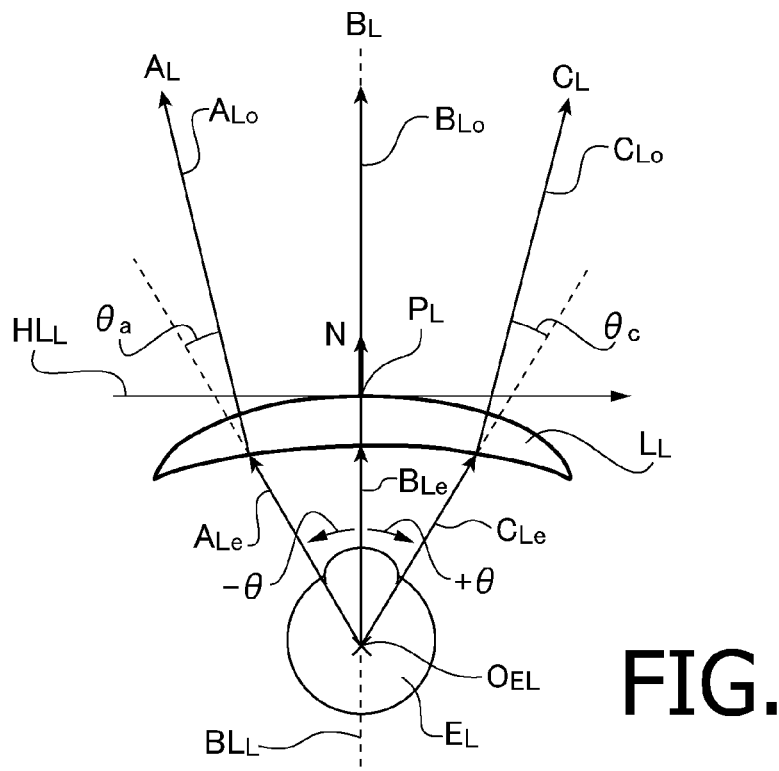
FIG. 6A illustrates a virtual optical model in which an initial lens model according to example 1 is disposed.
Figure 6B:
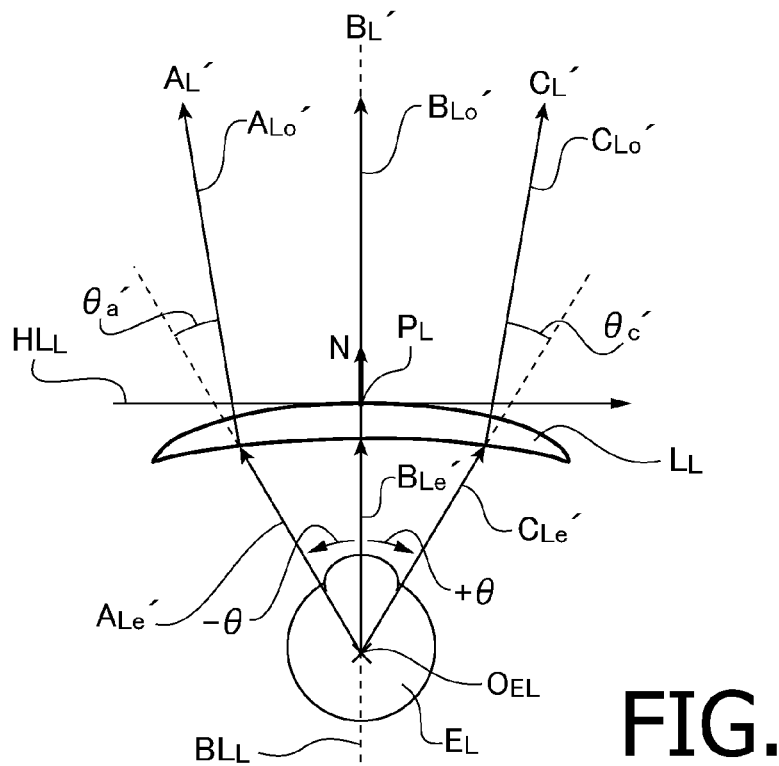
FIG. 6B illustrates a virtual optical model in which a target lens model according to the example 1 is disposed.

FIG. 6A illustrates a virtual optical model in which the lens model (the initial lens) $L_L$ according to the example 1 and the eyeball model $E_L$ are disposed, and in FIG. 6A the same reference symbols as those of FIG. 4A are assigned. FIG. 6B illustrates a virtual optical model in which the target lens (the ordinary spectacle lens) model $L_L$ and the eyeball model $E_L$ are disposed, and in FIG. 6B the same reference symbols as those of FIG. 4B are assigned. The design data of the lens model (the initial lens) $L_L$ and the target lens (the ordinary spectacle lens) model $L_L$ is as follows.

<Lens Model (Initial Lens) $L_L$>
BC: 10.00 Diopter
S: +2.00 Diopter
CT: 3.2 mm
Refractive Index: 1.6
<Target Lens (Ordinary Spectacle Lens) Model $L_L$>
BC: 4.00 Diopter
S: +2.00 Diopter
CT: 3.2 mm
Refractive Index: 1.6

FIG. 7A illustrates prism distribution of the lens model (the initial lens) $L_L$ according to the example 1. Since the lens model (the initial lens) $L_L$ has the lens front angle of zero, the distribution after reduction of difference between left and right according to the example 1 is equal to the prism distribution shown in FIG. 7A. FIG. 7B illustrates prism distribution (target distribution) of the target lens (the ordinary spectacle lens) $L_L$ of the example 1. FIG. 7C illustrates prism distribution of the practice design lens model according to the example 1 having the same deep base curve as that of the lens model (the initial lens) $L_L$. In each of FIGS. 7A to 7C, the left side diagram illustrates the horizontal component of the prism distribution, and the right side diagram illustrates the vertical component of the prism distribution (unit: prism diopter). Furthermore, in each of FIGS. 7A to 7C, the vertical axis represents the eyeball rotation angle (unit: degree) in the vertical direction, and the lateral axis represents the eyeball rotation angle (unit: degree) in the horizontal direction. FIG. 7D illustrates the convex surface (inner surface) shape of the practice design lens model according to the example 1, and the left side diagram illustrates the astigmatism distribution of the concave surface, and the right side diagram illustrates the average dioptric power distribution of the concave surface (unit: diopter).

FIG. 8A illustrates the prismatic power (unit: prism diopter) in the respective visual line directions (the angle of view θ (unit: degree) of the image side visual line in the vertical direction) of the example 1. In FIG. 8A, from the left side, the prismatic power of the practice design lens model, the prismatic power of the lens model (the initial lens) $L_L$, the prismatic power of the target lens (the ordinary spectacle lens) model $L_L$, the difference in prismatic power between the practice design lens model and the target lens (the ordinary spectacle lens) mode $L_L$, and the difference in prismatic power between the lens model (the initial lens) $L_L$ and the target lens (the ordinary spectacle lens) model $L_L$ are illustrated. In FIG. 8B, the respective prismatic powers shown in FIG. 8A are graphed. In FIG. 8B, a curve indicated by a solid line represents the prismatic power of the practice design lens model, a curve indicated by a dotted line represents the prismatic power of the lens model (the initial lens) $L_L$, and a curve indicated by a dashed line represents the prismatic power of the target lens (the ordinary spectacle lens) model $L_L$. In FIG. 8C, the respective differences in dioptric power shown in FIG. 8A are graphed. In FIG. 8C, a curve indicated by a solid line represents the difference in prismatic power between the practice design lens model and the target lens (the ordinary spectacle lens) model $L_L$, and a curve indicated by a dotted line represents the difference in prismatic power between the lens model (the initial lens) $L_L$ and the target lens (the ordinary spectacle lens) model $L_L$. FIG. 8D illustrates aberration (unit: diopter) at the respective visual line directions (the angle of view θ (unit: degree) of the image side visual line in the vertical direction) of the example 1. In FIG. 8D, from the left side, astigmatism (AS) of the practice design lens model, the power error (PE) of the practice design lens model, astigmatism (AS) of the lens model (the initial lens) $L_L$, and the power error (PE) of the lens model (the initial lens) $L_L$ are illustrated (unit: diopter).

As shown in FIGS. 7A to 7C and FIGS. 8B and 8C, in the example 1, the prism distribution of the lens model (the initial lens) $L_L$ is different from the target lens (the ordinary spectacle lens) model $L_L$ particularly in a peripheral region of the lens. On the other hand, the practice design lens model has the prism distribution equal to the prism distribution of the target lens (the ordinary spectacle lens) model $L_L$ within the entire lens region regardless of the fact that the practice design lens model has the deep base curve equal to the lens model (the initial lens) $L_L$. As described above, according to the example 1, by executing the design process shown in FIG. 3, it is possible to provide the practice design lens model which has a deep base curve and has substantially the same prismatic effect which the eyes feel in a state of wearing the ordinary spectacle lens having a shallow base curve.

Example 2

The lens model (the initial lens) $L_L$ according to the example 2 is a lens having no dioptric power and having a deep base curve, and has the lens front angle (the frame face from angle) of zero. As an example of such a lens, sunglasses designed to have a deep base curve and no dioptric power are assumed. The target in the example 2 is an ordinary spectacle lens configured such that the ordinary spectacle lens is prescribed with no dioptric power, has a shallower base curve than that of the lens model (the initial lens) $L_L$, and has the lens front angle of zero.

Figure 9A:
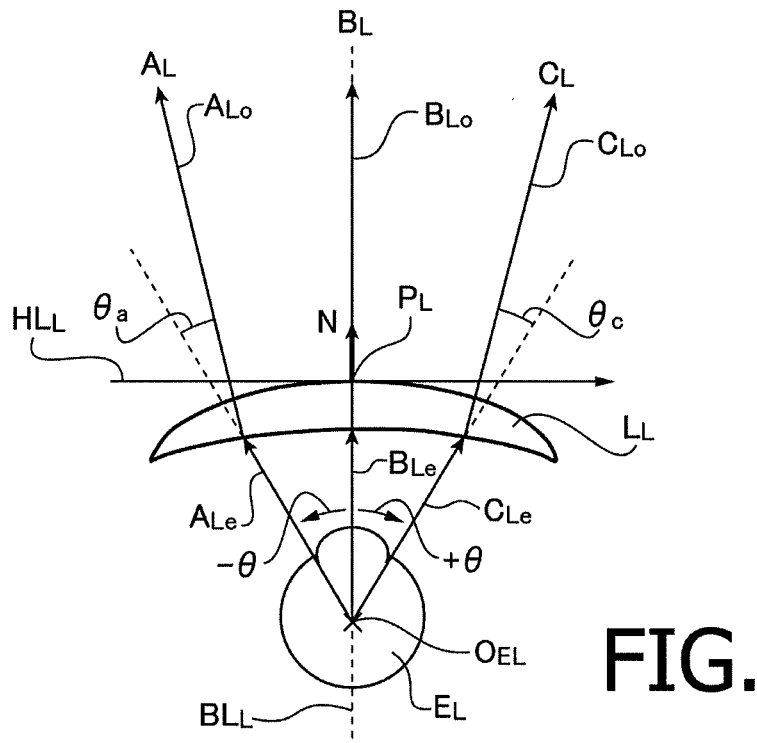
FIG. 9A illustrates a virtual optical model in which an initial lens model according to example 2 is disposed.
Figure 9B:
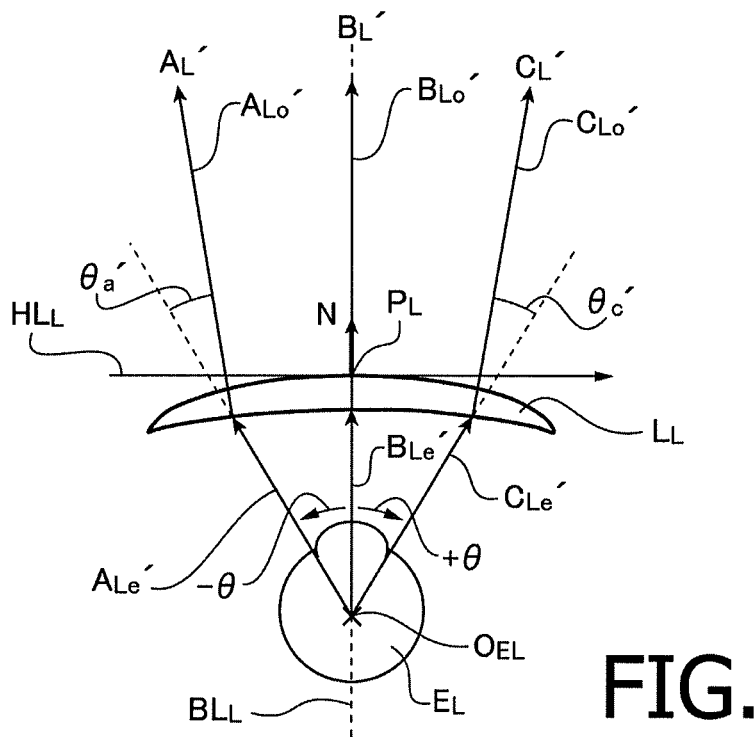
FIG. 9B illustrates a virtual optical model in which a target lens model according to the example 2 is disposed.

FIGS. 9A and 9B illustrate virtual optical models of the example 2. As in the case of FIG. 6A, FIG. 9A illustrates a virtual optical model in which the lens model (the initial lens) $L_L$ is disposed. As in the case of FIG. 6B, FIG. 9B illustrates a virtual optical model in which the target lens (the ordinary spectacle lens) model $L_L$ is disposed. The design data of the lens model (the initial lens) $L_L$ shown in FIG. 9A and the target lens (the ordinary spectacle lens) model $L_L$ shown in FIG. 9B is as follows.

<Lens Model (Initial Lens) $L_L$>
BC: 10.00 Diopter
S: 0.00 Diopter
CT: 2.0 mm
Refractive Index: 1.6
<Target Lens (Ordinary Spectacle Lens) Model $L_L$>
BC: 4.00 Diopter
S: 0.00 Diopter
CT: 2.0 mm
Refractive Index: 1.6

Figure 10A:
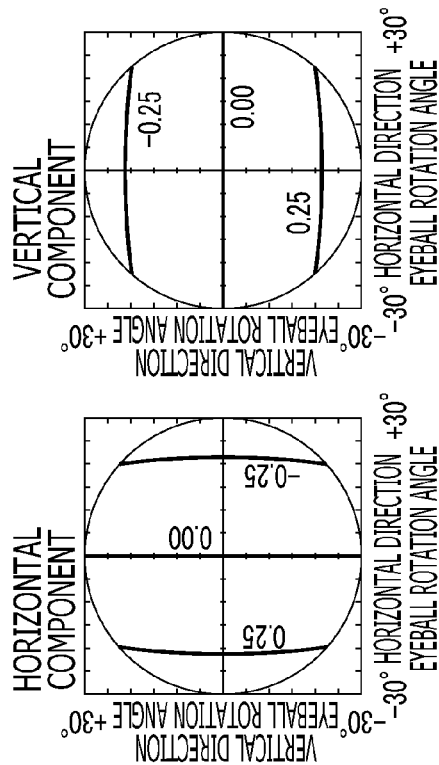
FIGS. 10A, 10B and 10C respectively illustrate prism distribution of the initial lens model, prism distribution of the target lens model and prism distribution of a design lens model according to the example 2 of the invention.
Figure 10B:
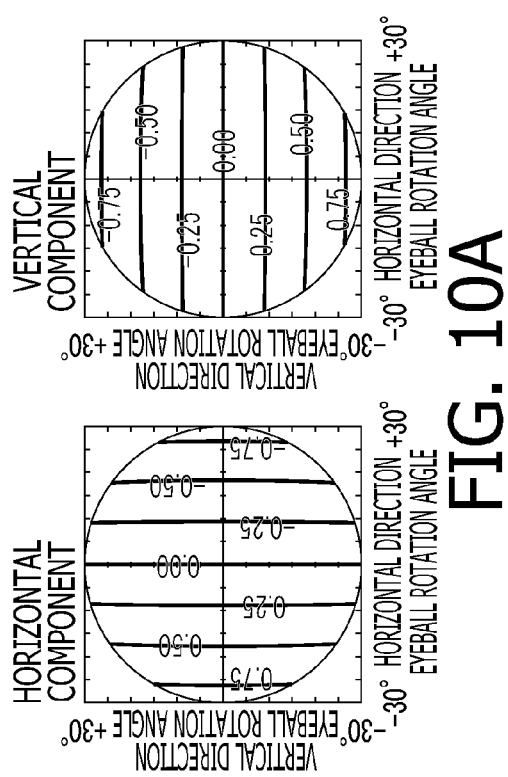
Figure 10C:
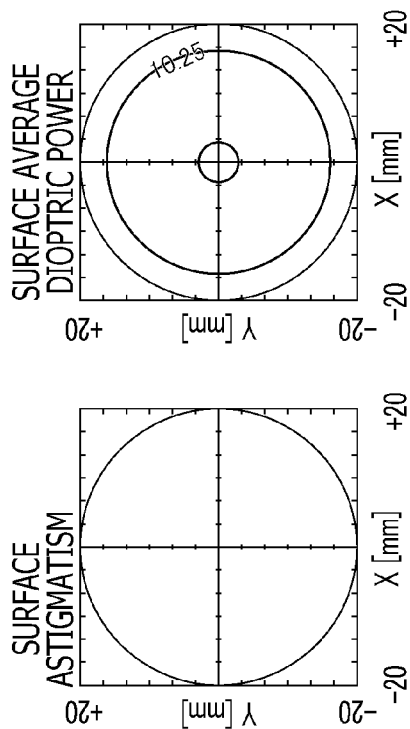
Figure 10D:
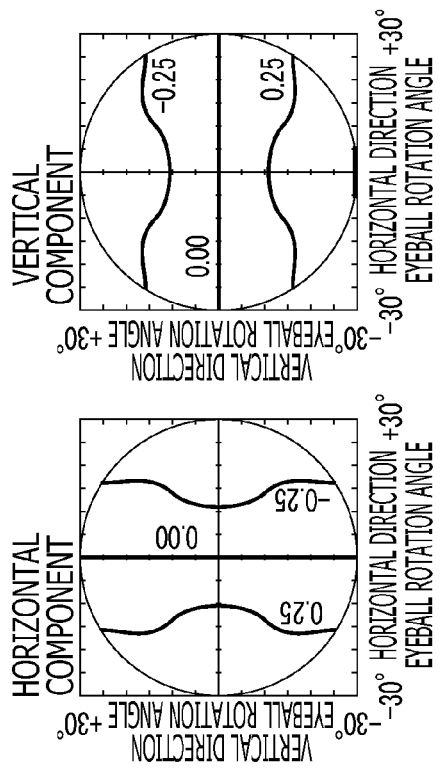
FIG. 10D illustrates a concave surface (an inner surface) shape of the design lens model according to the example 2 of the invention.

FIGS. 10A to 10C are diagrams similar to those of FIG. 7A to 7C, and respectively illustrate the prism distribution of the lens model (the initial lens) $L_L$, the prism distribution of the target lens (the ordinary spectacle lens) model $L_L$, and the prism distribution of the practice design lens model of the example 2. FIG. 10D is a diagram similar to that of FIG. 7D, and illustrates the convex surface (the inner surface) shape of the practice design lens model of the example 2.

FIG. 11A is a diagram similar to that of FIG. 8A, and illustrates the prismatic power in the respective visual line directions of the example 2. FIG. 11B is a diagram similar to that of FIG. 8B, and graphs the respective prismatic powers shown in FIG. 11A. FIG. 11C is a diagram similar to that of FIG. 8C, and graphs the respective differences in prismatic power shown in FIG. 11A. FIG. 11D is a diagram similar to that of FIG. 8D, and illustrates aberration in the respective visual line directions of the example 2.

As shown in FIGS. 10A to 10C and FIGS. 11B and 11C, in the example 2, the prism distribution of the lens model (the initial lens) $L_L$ is different from the target lens (the ordinary spectacle lens) model $L_L$ within the entire region of the lens. On the other hand, the practice design lens model has the prism distribution that approximates the prism distribution of the target lens (the ordinary spectacle lens) model $L_L$ within the entire lens region regardless of the fact that the practice design lens model has the deep base curve equal to the lens model (the initial lens) $L_L$. As described above, according to the example 2, by executing the design process shown in FIG. 3, it is possible to provide the practice design lens model which has a deep base curve and has the prismatic effect which approximates the prismatic effect that the eyes feel in a state of wearing the ordinary spectacle lens having a shallow base curve.

Example 3

The lens model (the initial lens) $L_L$ according to the example 3 is the same as that of the example 2. Specifically, the lens model (the initial lens) $L_L$ according to the example 3 has no dioptric power, has a deep base curve, and has the lens front angle (the frame face from angle) of zero. The target in the example 3 is the naked eyes. That is, in the example 3, the prismatic effect that the eyes feel in a state of wearing the practice design lens approaches the state of naked eyes (i.e., distribution in which the prismatic effect is zero over the entire region before the eyes).

Figure 12A:
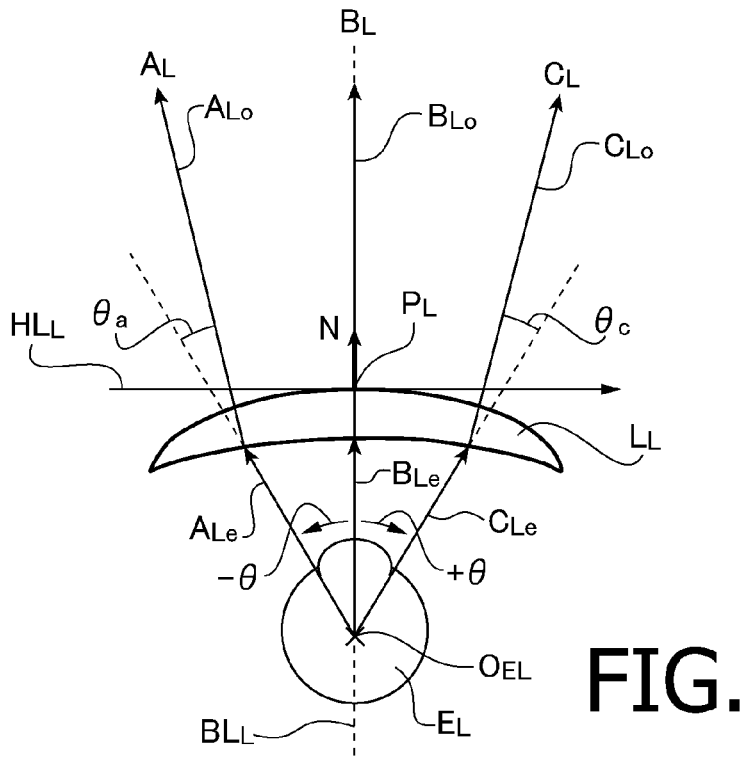
FIG. 12A illustrates a virtual optical model in which an initial lens model according to example 3 is disposed.
Figure 12B:
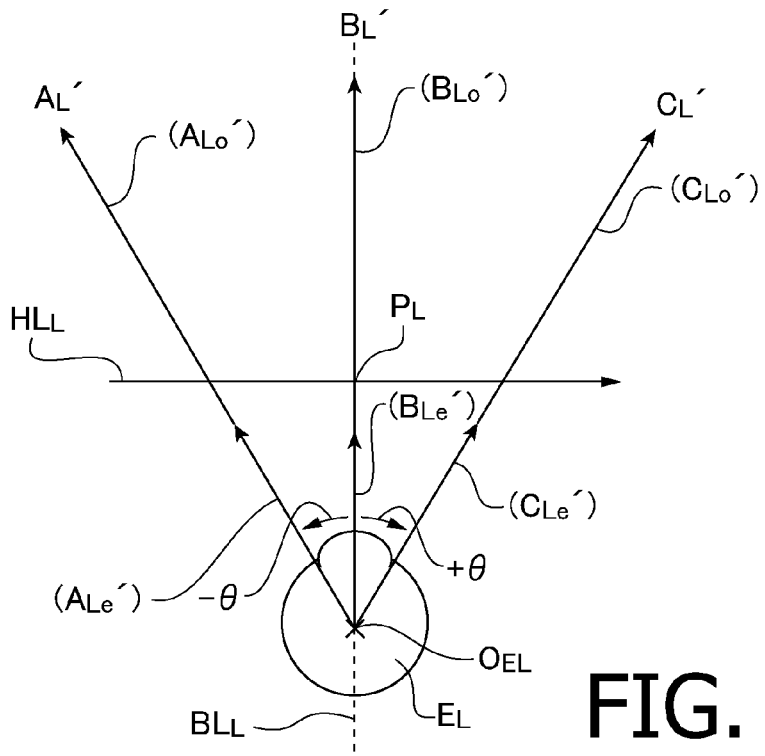
FIG. 12B illustrates a virtual optical model in which a target lens model according to the example 3 is disposed.

FIGS. 12A and 12B illustrate virtual optical models of the example 3. As in the case of FIG. 6A, FIG. 12A illustrates a virtual optical model in which the lens model (the initial lens) $L_L$ is disposed. FIG. 12B illustrates a virtual optical model for naked eyes in which only the eyeball model $E_L$ is disposed. Since the design data of the lens model (the initial lens) $L_L$ shown in FIG. 12A is the same as that of the lens model (the initial lens) $L_L$ of the example 2, explanation thereof is omitted.

Figure 13A:
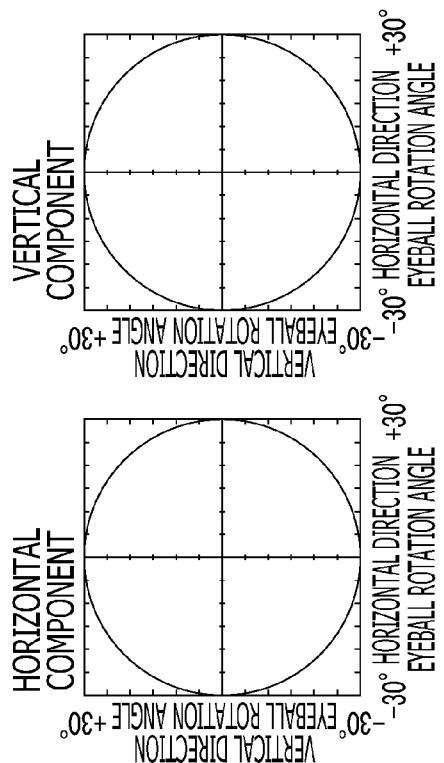
FIGS. 13A, 13B and 13C respectively illustrate prism distribution of the initial lens model, a target prism distribution (no prismatic effect because of naked eyes) and prism distribution of a design lens model according to the example 3 of the invention.
Figure 13B:
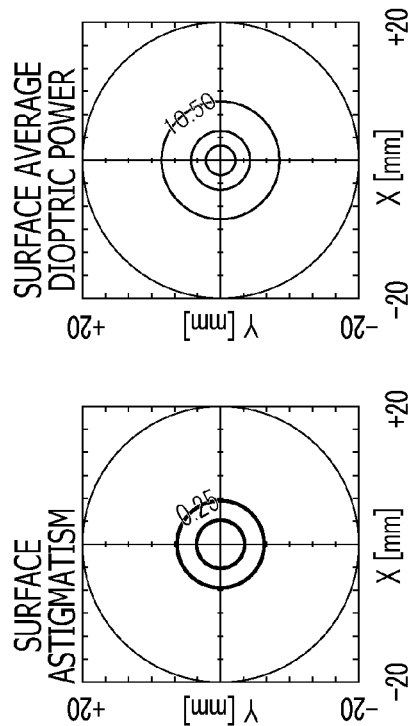
Figure 13C:
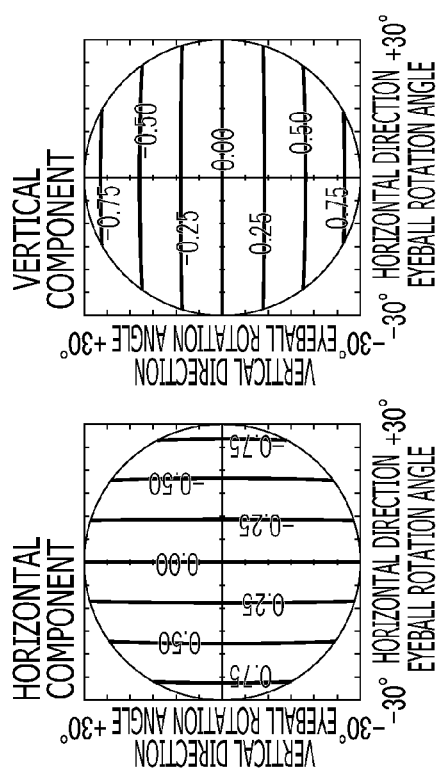
Figure 13D:
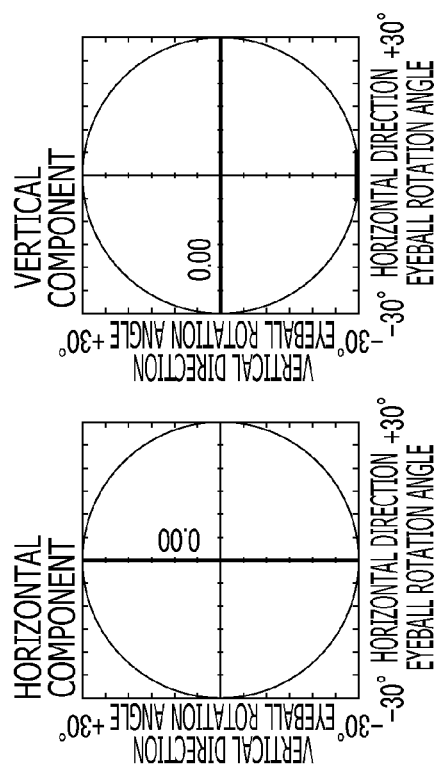
FIG. 13D illustrates a concave surface (an inner surface) shape of the design lens model according to the example 3 of the invention.

FIGS. 13A to 13C are diagrams similar to those of FIG. 10A to 10C, and respectively illustrate the prism distribution of the lens model (the initial lens) $L_L$, the prism distribution of the target (the state of naked eyes), and the prism distribution of the practice design lens model of the example 3. FIG. 13D is a diagram similar to that of FIG. 10D, and illustrates the convex surface (the inner surface) shape of the practice design lens model of the example 3.

FIG. 14A is a diagram similar to that of FIG. 11A, and illustrates the prismatic power in the respective visual line directions of the example 3. FIG. 14B is a diagram similar to that of FIG. 11B, and graphs the respective prismatic powers shown in FIG. 14A. FIG. 14C is a diagram similar to that of FIG. 11C, and graphs the respective differences in prismatic power shown in FIG. 14A. FIG. 11D is a diagram similar to that of FIG. 8D, and illustrates aberration in the respective visual line directions of the example 3.

As shown in FIGS. 13A to 13C and FIGS. 14B and 14C, in the example 3, the prism distribution of the lens model (the initial lens) $L_L$ is different from the target (the state of naked eyes) within the entire region of the lens. On the other hand, the practice design lens model has the prism distribution that approximates the prism distribution of the target (the state of naked eyes) within the entire lens region regardless of the fact that the practice design lens model has the deep base curve equal to the lens model (the initial lens) $L_L$. As described above, according to the example 3, by executing the design process shown in FIG. 3, it is possible to provide the practice design lens model which has a deep base curve and has the prismatic effect which approximates the state of naked eyes (i.e., a state of no prismatic effect).

The foregoing is the explanation about the embodiment of the invention. Embodiments according to the invention are not limited to the above described examples, and various types of variations can be made within the scope of the technical concept of the invention. For example, embodiments may include examples and variations described herein by way of illustration or modifications thereof combined in an appropriate manner. For example, in step S16 in FIG. 3 according to the embodiment, the lens concave surface shape is corrected; however, in another embodiment the lens convex surface shape may be corrected or both of the convex surface and the concave surface may be corrected.

Figure 15:
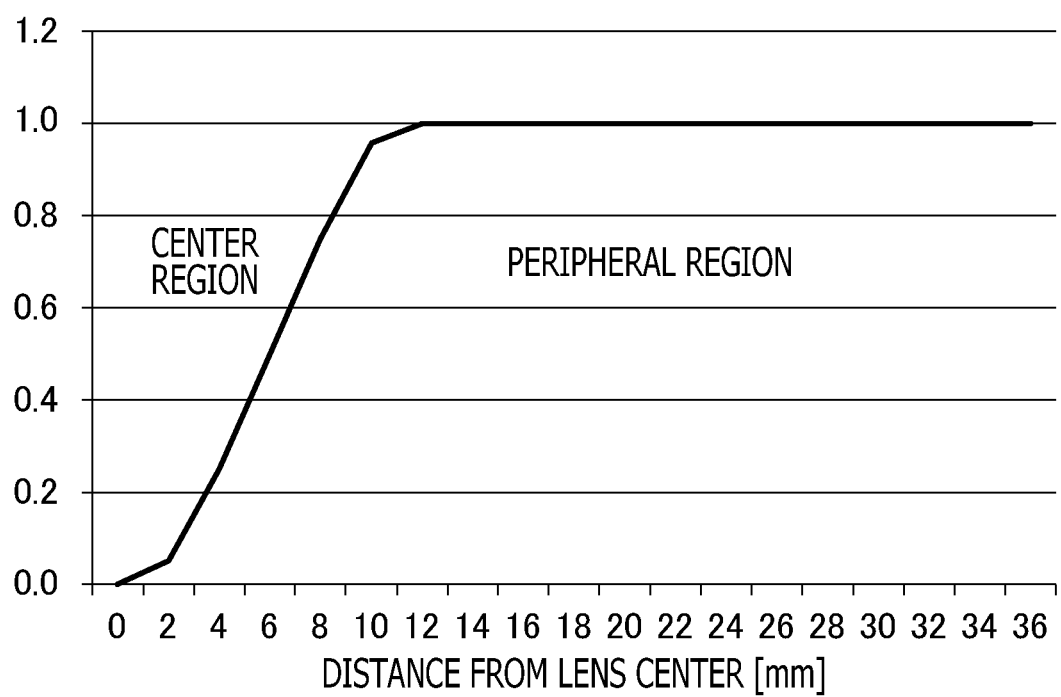
FIG. 15 illustrates an example of weighting of prism correction.

In a spectacle lens, there is a trade-off relationship between the dioptric power (unit: diopter) and the prismatic power (unit: prism diopter). Therefore, there is a possibility that, by correcting the prismatic effect in step S16 (correction of lens concave surface shape) in FIG. 3, the dioptric power in a central part of the spectacle lens aiming at the visual acuity correction changes. In this case, regarding a spectacle lens (e.g., wrap-around type sunglasses) not aiming at the visual acuity correction, the dioptric power which is not essentially required is added to the central part of the spectacle lens. Although it is possible to correct an extra dioptric power in step S17 (correction of dioptric power) in FIG. 3, there is a possibility that the correction of the extra dioptric power may cancel the effect of the prism correction in a peripheral part and thereby desired advantageous effect may be lost. Therefore, it is preferable to execute correction while placing importance on dioptric power in a central region and placing importance on prismatic effect only in a peripheral region. FIG. 15 illustrates an example of weighting of prism correction. In FIG. 15, the vertical axis represents the weighting value for the prism correction, and the horizontal axis represents the distance from the center of the lens (unit: mm). As shown in FIG. 15, regarding a spectacle lens having a deep base curve, by suppressing the prism correction in the central region, a spectacle lens configured such that the prismatic effect in a peripheral region of the lens coincides with or approximates the ordinary state while maintaining the required dioptric power in the central region of the lens can be obtained.

What is claimed is:
1. A lens supply system, comprising:
an initial shape data obtaining unit configured to obtain initial shape data of a spectacle lens;
a shape data correcting unit configured to correct the initial shape data such that, when a base curve of an initial lens manufactured based on the initial shape data is defined as a first base curve, a predetermined lens having a second base curve lower than the first base curve is defined as a target spectacle lens, prismatic effect distribution which light rays in respective visual line directions passing through a center of an eye assumed in optical design receive from the initial lens coincide with or approach prismatic effect distribution which the light rays receive from the target spectacle lens, while maintaining the first base curve before and after correction; and
a spectacle lens manufacturing unit configured to manufacture a spectacle lens based on the corrected initial shape data,
wherein the shape data correcting unit calculates a shift amount between the prismatic effect distribution which the light rays receive from the initial lens and the prismatic effect distribution which the light rays receive from the target spectacle lens, and corrects at least one of a convex surface and a concave surface of the initial lens such that the calculated shift amount in a peripheral region of the initial lens falls within a predetermined tolerance.

2. The lens supply system according to claim 1, further comprising:
a shape measuring unit configured to measure a shape of an ordinary spectacle lens which is defined as a spectacle lens which a wearer scheduled to wear the manufactured spectacle lens usually wears; and
an ordinary spectacle lens data generating unit configured to generate shape data of the ordinary spectacle lens based on a result of the measuring,
wherein the shape data correcting unit corrects the initial shape data based on the shape data of the ordinary spectacle lens such that the prismatic effect distribution which the light rays in respective visual line directions passing through the center of the eye assumed in optical design receive from the initial lens coincide with or approach prismatic effect distribution which the light rays receive from the ordinary spectacle lens, while maintaining the first base curve before and after correction.

3. The lens supply system according to claim 2, further comprising an inputting unit configured to input a value of a base curve of the ordinary spectacle lens measured by the shape measuring unit.

4. The lens supply system according to claim 1, further comprising a sample selecting unit configured to select a sample lens from a plurality of types of predetermined sample lenses,
wherein the shape data correcting unit corrects the initial shape data based on shape data of the sample lens selected by the sample selecting unit such that the prismatic effect distribution which the light rays in respective visual line directions passing through the center of the eye assumed in optical design receive from the initial lens coincide with or approach prismatic effect distribution which the light rays receive from the sample lens selected by the sample selecting unit, while maintaining the first base curve before and after correction.

5. The lens supply system according to claim 1, wherein the center of the eye is an eyeball rotation center or a center of an entrance pupil of the eye in a state of frontward viewing.

6. A lens supply system, comprising:
an initial shape data obtaining unit configured to obtain initial shape data of a spectacle lens; and
a shape data correcting unit configured to correct the initial shape data such that prismatic effect distribution which light rays in respective visual line directions passing through a center of an eye assumed in optical design receive from an initial lens manufactured based on the initial shape data coincide with or approach a state of a naked eye not having prismatic effect distribution, while maintaining a base curve before and after correction,
wherein the shape data correcting unit calculates a shift amount between the prismatic effect distribution which the light rays receive from the initial lens and a state where the light rays do not receive prismatic effect distribution, and corrects at least one of a convex surface and a concave surface of the initial lens such that the calculated shift amount in a peripheral region of the initial lens falls within a predetermined tolerance.

7. A spectacle lens having a shape formed based on correction data obtained by correcting initial shape data, wherein the initial shape data is corrected, while placing importance on dioptric power in comparison to prism in a lens center region and placing importance on prism in comparison to dioptric power in a lens peripheral region, such that, when a base curve of an initial lens manufactured based on the initial shape data is defined as a first base curve, a predetermined lens having a second base curve lower than the first base curve is defined as a target spectacle lens, prismatic effect distribution which light rays in respective visual line directions passing through a center of an eye assumed in optical design receive from the initial lens coincide with or approach prismatic effect distribution which the light rays receive from the target spectacle lens, and such that a shift amount in a peripheral region of the initial lens between the prismatic effect distribution which the light rays receive from the initial lens and the prismatic effect distribution which the light rays receive from the target spectacle lens falls within a predetermined tolerance.

8. The spectacle lens according to claim 7,
wherein the spectacle lens has the shape formed based on the correction data obtained by correcting the initial shape data while placing importance on dioptric power in comparison to prism in a lens center region and placing importance on prism in comparison to dioptric power in a lens peripheral region, such that the prismatic effect distribution which the light rays in respective visual line directions passing through the center of the eye assumed in optical design receive from the initial lens coincide with or approach prismatic effect distribution which the light rays receive from an ordinary spectacle lens which is defined as a lens which a wearer scheduled to wear the spectacle lens usually wears.

9. A spectacle lens having a shape formed based correction data obtained by correcting initial shape data, wherein the initial shape data is corrected while placing importance on dioptric power in comparison to prism in a lens center region and placing importance on prism in comparison to dioptric power in a lens peripheral region, such that prismatic effect distribution which light rays in respective visual line directions passing through a center of an eye assumed in optical design receive from an initial lens manufactured based on the initial shape data coincide with or approach a state of a naked eye not having prismatic effect distribution, and such that a shift amount in a peripheral region of the initial lens between the prismatic effect distribution which the light rays receive from the initial lens and a state where the light rays do not receive prismatic effect distribution falls within a predetermined tolerance.

10. A manufacturing method for a spectacle lens, comprising:
obtaining initial shape data of a spectacle lens;
correcting the initial shape data such that, when a base curve of an initial lens manufactured based on the initial shape data is defined as a first base curve, a predetermined lens having a second base curve lower than the first base curve is defined as a target spectacle lens, prismatic effect distribution which light rays in respective visual line directions passing through a center of an eye assumed in optical design receive from the initial lens coincide with or approach prismatic effect distribution which the light rays receive from the target spectacle lens, while maintaining the first base curve before and after correction; and
manufacturing step of manufacturing the spectacle lens based on the corrected initial shape data,
wherein the correcting the initial shape data comprises:
calculating a shift amount between the prismatic effect distribution which the light rays receive from the initial lens and the prismatic effect distribution which the light rays receive from the target spectacle lens; and
correcting at least one of a convex surface and a concave surface of the initial lens such that the calculated shift amount in a peripheral region of the initial lens falls within a predetermined tolerance.

* * * * *